United States Patent [19]

Shirakihara et al.

[11] Patent Number: 5,802,267
[45] Date of Patent: Sep. 1, 1998

[54] METHOD FOR CHECKPOINTING IN COMPUTER SYSTEM UNDER DISTRIBUTED PROCESSING ENVIRONMENT

[75] Inventors: Toshio Shirakihara; Tatsunori Kanai; Hideaki Hirayama, all of Tokyo, Japan

[73] Assignee: Kabushiki Kaisha Toshiba, Kawasaki, Japan

[21] Appl. No.: 711,846

[22] Filed: Sep. 10, 1996

[30] Foreign Application Priority Data

Sep. 11, 1995 [JP] Japan .................................. 7-232517
Aug. 6, 1996 [JP] Japan .................................. 8-207339

[51] Int. Cl.$^6$ ........................................... G26F 11/00
[52] U.S. Cl. .................................. 395/182.13; 364/285.2
[58] Field of Search .................. 395/182.13, 182.14, 395/182.15, 182.17, 182.16, 569; 364/285.2

[56] References Cited

U.S. PATENT DOCUMENTS

| | | | |
|---|---|---|---|
| 4,665,520 | 5/1987 | Strom et al. | 371/7 |
| 5,008,786 | 4/1991 | Thatte | 364/200 |
| 5,301,309 | 4/1994 | Sugano | 395/575 |
| 5,333,303 | 7/1994 | Mohan | 395/575 |
| 5,333,314 | 7/1994 | Masai et al. | 395/600 |
| 5,590,277 | 12/1996 | Fuchs et al. | 395/183.14 |
| 5,634,096 | 5/1997 | Baylor et al. | 395/182.04 |

OTHER PUBLICATIONS

Bhargava et al., "Independent Checkpointing and Concurrent Rollback for Recovery in Distributed Systems—An Optimistic Approach", IEEE, pp. 3–12, 1988.

Litzkow et al., "Supporting Checkpointing and Process Migration Outside the Unix Kernel", Computer Sciences Department, University of Wisconsin, Usenix—Winter (1992), pp. 283–290.

Chandy et al., "Distributed Snapshots: Determining Global States of Distributed Systems", ACM Transaction on Computer Systems, vol. 3, No. 1, (1985), pp. 63–75.

Plank et al., "ICKP: A Consistent Checkpointer for Multicomputers", IEEE Parallel & Distributed Technology, vol. 2, No. 2, (1994), pp. 62–67.

Primary Examiner—Robert W. Beausoliel, Jr.
Assistant Examiner—Scott T. Baderman
Attorney, Agent, or Firm—Foley & Lardner

[57] ABSTRACT

A scheme for checkpointing and a computer system capable of realizing the distributed checkpointing for processes which carry out the inter-process communications, while shortening a stopping time of the processes due to the distributed checkpointing. The inter-process communications of each process are stopped while continuing the normal processing of each process first, and a checkpointing processing for each process is executed when the inter-process communications of all processes are stopped. Alternatively, the inter-computer type inter-process communications of each process are stopped while continuing the intra-computer type inter-process communications and the normal processing of each process first, and a checkpointing processing for each process is executed while stopping the intra-computer type inter-process communications of each process when the inter-computer type inter-process communications of all processes are stopped.

22 Claims, 25 Drawing Sheets

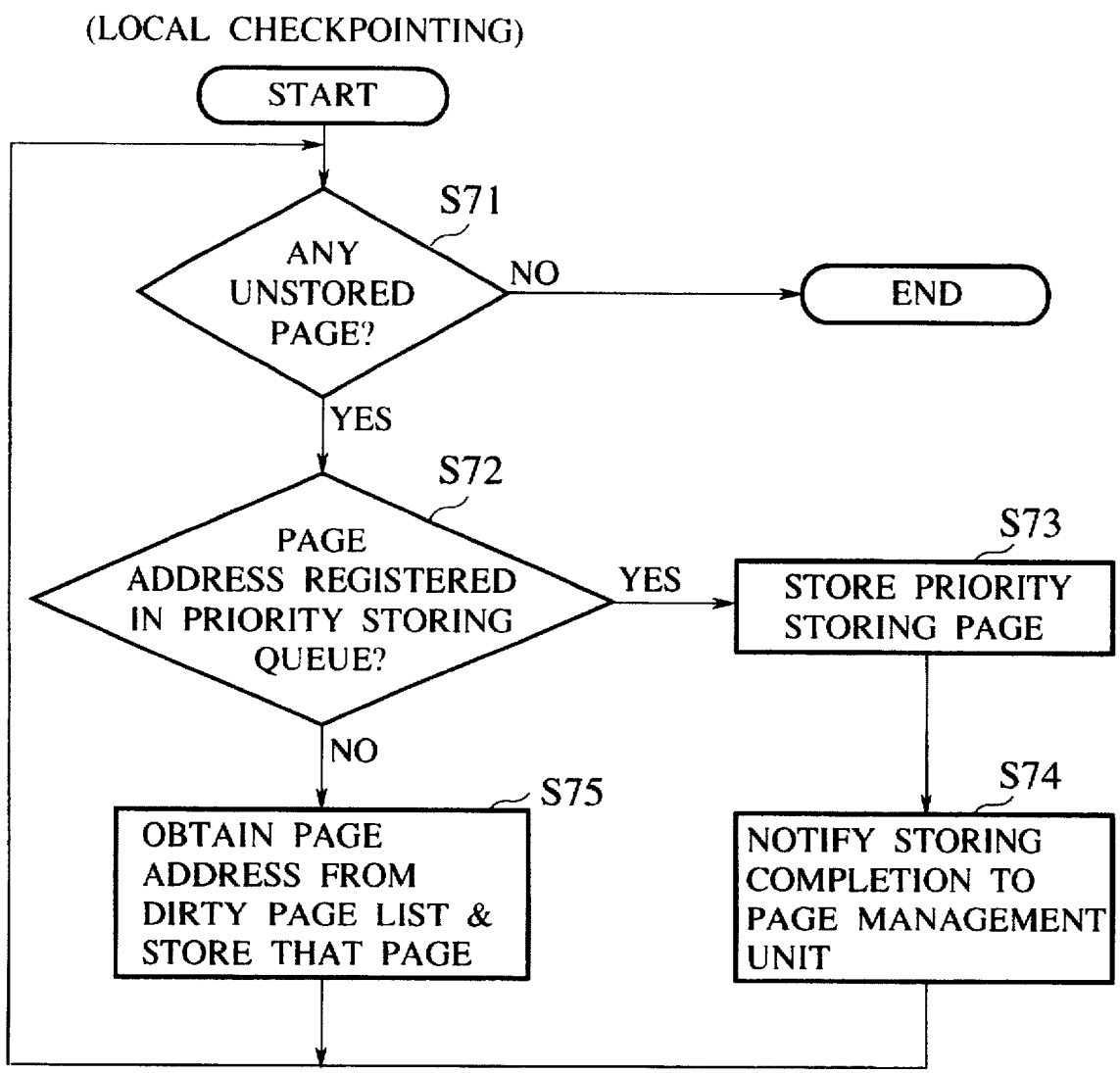

FIG.22 (COMMUNICATION CONTROL UNIT)

METHOD FOR CHECKPOINTING IN COMPUTER SYSTEM UNDER DISTRIBUTED PROCESSING ENVIRONMENT

BACKGROUND OF THE INVENTION

1. Field of the Invention

The present invention relates to a method for checkpointing for a plurality of processes operating under a distributed processing environment while carrying out inter-process communications, and a computer system utilizing the checkpointing method.

2. Description of the Background Art

In general, a computer system is provided with various recovery functions in order to increase a reliability of program execution. As one such recovery function, the checkpoint/restart scheme is conventionally known. In this checkpoint restart scheme, an information necessary for re-execution from a state in a middle of execution of a program is regularly stored. A point for storing this information is called checkpoint, and an act of storing this information is called checkpointing. When a program execution is interrupted by an occurrence of a trouble, a state of that interrupted process is rolled back to a checkpoint immediately before an occurrence of a trouble, and this process is re-executed from that checkpoint.

In a system in which one process operates independently, the checkpointing for intermediate states of that process alone is sufficient, but in a distributed system in which a plurality of processes operate in parallel while carrying out inter-process communications, the checkpointing for a single process alone is insufficient. Namely, there is a need for the checkpointing for a plurality of processes which are related with each other by the inter-process communications so that these processes can be re-executed without a contradiction. In the following, a checkpoint for each process is referred to as a local checkpoint, and a set of local checkpoints corresponding to the related processes is referred to as a distributed checkpoint.

For the inter-process communications among processes under the distributed environment, a message passing and a data exchange using shared memory or file sharing are available. The message passing is a means for carrying out the data exchange by synchronizing a message transmission side and a message reception side. The shared memory is a memory shared among a plurality of processes, which can be directly read and written by each process, where a result of writing can be seen by any of these processes. A file is accessible from a plurality of processes, and an information exchange can be realized when one process writes an information into the file, and the other process reads out that information from that file. The message passing is a synchronous inter-process communication, whereas the information exchange using shared memory or file sharing is an asynchronous inter-process communication.

In addition, the shared memory is used for inter-process communications within the same computer, whereas the message passing can be used for the inter-process communications between different computers, as well as for the inter-process communications within the same computer. The file can be shared among processes within the same computer, and the file can also be shared among processes of different computers by utilizing a network file system, so that the file can be utilized for the inter-process communications between different computers. Note however that there is a type of file system which does not guarantee that an information written by one process is going to be valid for the other processes immediately. In the following, the inter-process communication between the computers will be referred to as an inter-computer IPC, while the inter-process communication within the same computer will be referred to as an intra-computer IPC.

The information which must be stored at a time of distributed checkpointing includes the following.

(a) A content of an address space of a process, and a content of a hardware register in an execution state.

(b) A state of file input/output.

(c) A state of a communication path used in the message passing.

(d) A state of a shared memory.

Of these, (a) is a process local state, while (c) and (d) are states that can be affected by the other processes. (b) is a process local state in a case of not using a file sharing with the other processes, but is a state that can be affected by the other processes in a case of using a file sharing with the other processes. Namely, for a process which does not carry out the inter-process communication with the other process, it suffices to store states of (a) and (b). For a method for storing states of (a) and (b), see M. Litzhow and M. Solomon: "Supporting Checkpointing and Process Migration Outside The Unix Kernel", Proc. of USENIX Association Winter Conference 1992, pp. 283–290 (Jan. 1992).

Normally, an address space of a process has a text region for storing execution codes, a data region for storing data for execution, and a stack region for storing transient variables during execution.

In the method disclosed in the above noted reference, at a time of local checkpointing, a content of an address space is stored after a normal processing is stopped. In addition, in order to store an execution position at a time of a normal processing stop, a content of a hardware register is stored. As for the file input/output, an opened file path and a seek pointer for indicating a file operation position at a time of a normal processing step are stored. At a time of resuming execution from a local checkpoint, (1) an address space is recovered, (2) a file is re-opened and a seek pointer is set, and (3) a stored hardware register content is set, and then an execution is resumed.

On the other hand, for (b), (c) and (d), states of a plurality of processes which carry out the distributed processing must be stored in such a manner which maintains the consistency. FIGS. 1A, 1B and 1C show some examples of the distributed checkpointing for processes which carry out the inter-process communications by the message passing.

FIGS. 1A, 1B and 1C show examples of three types of distributed checkpoint timings CH1, CH2, and CH3 in a case where a processing is carried out while each one of three processes p1, p2 and p3 carries out the message passing. Each of these timings CH1, CH2 and CH3 is a synchronous checkpointing timing, which is given by a management process which commands the checkpointing to the processes p1, p2 and p3. Also, in FIGS. 1A, 1B, and 1C, a symbol m indicates a message, and two numerals suffixed to this symbol m indicate a message transmission side process number and a message reception side process number respectively.

In FIG. 1A, at CH1, the processes p1, p2 and p3 are checkpointing the local checkpoints ch11, ch12 and ch13 respectively, but for a message m32, despite of the fact that the process p3 is still in a state of not transmitting this message at ch13, the process p2 is in a state of already received this message at ch12. For this reason, when a trouble occurs in any one process and the processes are to be re-executed by rolling back to CH1, a contradiction regarding the message m32 arises. Similarly, for CH3 of FIG. 1C, the contradiction regarding the message m23 arises.

In contrast to these, at CH2 of FIG. 1B, there is no contradiction for each message, so that the roll back and the re-execution can be realized correctly.

As a scheme for guaranteeing the consistency of the distributed checkpoint, there is a scheme disclosed in K. Mani Chandy and L. Lamport: "Distributed Snapshots: Determining Global States of Distributed Systems", ACM Trans. of Computer Systems, Vol. 3, No. 1, pp. 63–75 (Feb. 1985). This scheme deals with the message passing as the inter-process communication, similarly as the examples described above, and defines the consistent distributed checkpoint as "a state without a message which is not yet transmitted and already received". The message m32 of FIG. 1A which is distributed checkpointing at a timing of CH1 is a message which is not yet transmitted and already received, so that CH1 is an inconsistent timing.

Also, in this scheme, a message re-transmission is carried out in order to maintain the consistency. For example, the message m23 of FIG. 1C is going to be a message which is already transmitted and not yet received when the processes are rolled back to CH3, and the consistent trouble recovery can be carried out by the re-transmission of this message m23.

Also, in this scheme, a consistent state is realized by sending a message called marker between the processes. By means of this, the distributed checkpointing for processes which carry out the message passing can be carried out in a state which maintains the consistency.

However, this scheme presupposes the synchronous inter-process communication such as the message passing, and there is a problem that it is not applicable to an asynchronous inter-process communication such as an information exchange using shared memory or file sharing.

On the other hand, apart from the above scheme proposed by Mani Chandy et al., J. S. Plank and K. Li: "ickp: A Consistent Checkpointer for Multicomputers", IEEE Parallel & Distributed Technology System Application, Vol. 2, No. 2, pp. 62–67 (1994) proposes a scheme for local checkpointing by establishing a synchronization using the two-phase commit protocol. In this scheme, all the mutually related processes are stopped at the first phase and a state with no message state is produced, and then after the local checkpointing for all the processes is carried out, the processing of all the processes is resumed at the second phase.

Namely, the distributed checkpointing is to be carried out in a state at CH2 shown in FIG. 1B. This scheme is applicable to both the message passing and the information exchange using shared memory or file sharing by prohibiting an access to a shared memory or a file at the first phase, but the processing of all the mutually related processes are to be stopped at the first phase, so that there is a problem that the process stopping time becomes very long. In other words, in this scheme, the checkpointing of the local checkpoints is made after the processing of all the related processes is stopped in synchronization, so that there is a problem that the normal processing is completely stopped during the distributed checkpointing.

SUMMARY OF THE INVENTION

It is therefore an object of the present invention to provide a scheme for checkpointing and a computer system capable of realizing the distributed checkpointing for processes which carry out the message passing or the information exchange using shared memory or file sharing, while shortening a stopping time of the processes due to the distributed checkpointing.

According to one aspect of the present invention there is provided a method for checkpointing for a plurality of processes operating under a distributed processing environment while carrying out inter-process communications, the method comprising the steps of: stopping the inter-process communications of each process while continuing a normal processing of each process; and executing a checkpointing processing for each process, when the inter-process communications of all processes are stopped at the stopping step.

According to another aspect of the present invention there is provided a method for checkpointing for a plurality of processes operating under a distributed processing environment while carrying out inter-process communications, the method comprising the steps of: commanding each process to stop the inter-process communications of each process while continuing a normal processing of each process; and commanding each process to execute a checkpointing processing for each process, when a stopping of the inter-process communications of all processes is confirmed.

According to another aspect of the present invention there is provided a method for checkpointing for a plurality of processes operating under a distributed processing environment while carrying out inter-process communications, the method comprising the steps of: stopping at each process the inter-process communications of each process while continuing a normal processing of each process, upon receiving an inter-process communication stop command; and starting at each process an execution of a checkpointing processing for each process, upon receiving a checkpointing command.

According to another aspect of the present invention there is provided a method for checkpointing for a plurality of processes on computers, the processes being operating under a distributed processing environment while carrying out inter-process communications including inter-computer type inter-process communications to be carried out among the computers and intra-computer type inter-process communications to be carried out within one computer, the method comprising the steps of: stopping the inter-computer type inter-process communications of each process while continuing the intra-computer type inter-process communications and a normal processing of each process; and executing a checkpointing processing for each process while stopping the intra-computer type inter-process communications of each process, when the inter-computer type inter-process communications of all processes are stopped at the stopping step.

According to another aspect of the present invention there is provided a method for checkpointing for a plurality of processes on computers, the processes being operating under a distributed processing environment while carrying out inter-process communications including inter-computer type inter-process communications to be carried out among the computers and intra-computer type inter-process communications to be carried out within one computer, the method comprising the steps of: commanding each process to stop the inter-computer type inter-process communications of each process while continuing the intra-computer type inter-process communications and a normal processing of each process; and commanding each process to execute a checkpointing processing for each process while stopping the intra-computer type inter-process communications of each process, when a stopping of the inter-computer type inter-process communications of all processes is confirmed.

According to another aspect of the present invention there is provided a method for checkpointing for a plurality of processes on computers, the processes being operating under a distributed processing environment while carrying out inter-process communications including inter-computer type inter-process communications to be carried out among the computers and intra-computer type inter-process communications to be carried out within one computer, the method comprising the steps of: stopping at each process the inter-computer type inter-process communications of each process while continuing the intra-computer type inter-process communications and a normal processing of each process, upon receiving an inter-computer type inter-process communication stop command; and starting at each process an execution of a checkpointing processing for each process while stopping the intra-computer type inter-process communications of each process, upon receiving a checkpointing command.

According to another aspect of the present invention there is provided a computer system, comprising: a plurality of process means operating under a distributed processing environment while carrying out inter-process communications; and checkpointing command means for issuing an inter-process communication stop command commanding a stopping of the inter-process communications of each process means, and issuing a checkpointing command commanding an execution of a checkpointing processing for each process means when responses to the inter-process communication stop commands from all process means are received; wherein each process means stops the inter-process communications of each process means while continuing a normal processing of each process means upon receiving the inter-process communication stop command and returns a response to the inter-process communication stop command when the inter-process communications of each process means are stopped, and starts an execution of the checkpointing processing for each process means upon receiving the checkpointing command.

According to another aspect of the present invention there is provided a computer system, comprising: a plurality of process means provided on computers, the process means being operating under a distributed processing environment while carrying out inter-process communications including inter-computer type inter-process communications to be carried out among the computers and intra-computer type inter-process communications to be carried out within one computer; and checkpointing command means for issuing an inter-computer type inter-process communication stop command commanding a stopping of the inter-computer type inter-process communications of each process means, and issuing a checkpointing command commanding an execution of a checkpointing processing for each process means and a stopping of the intra-computer type inter-process communications of each process means when responses to the inter-computer type inter-process communication stop commands from all process means are received; wherein each process means stops the inter-computer type inter-process communications of each process means while continuing the intra-computer type inter-process communications and a normal processing of each process means upon receiving the inter-computer type inter-process communication stop command and returns a response to the inter-computer type inter-process communication stop command when the inter-computer type inter-process communications of each process means are stopped, and starts an execution of the checkpointing processing for each process means while stopping the intra-computer type inter-process communications of each process means upon receiving the checkpointing command.

Other features and advantages of the present invention will become apparent from the following description taken in conjunction with the accompanying drawings.

BRIEF DESCRIPTION OF THE DRAWINGS

FIG. 13 is a flow chart of the operation for the local checkpointing processing by the local checkpointing unit in the distributed system of FIG. 11.

DETAILED DESCRIPTION OF THE PREFERRED EMBODIMENTS

Referring now to FIG. 2 to FIG. 6, the first embodiment of a scheme for checkpointing according to the present invention will be described in detail.

Figure 1A:
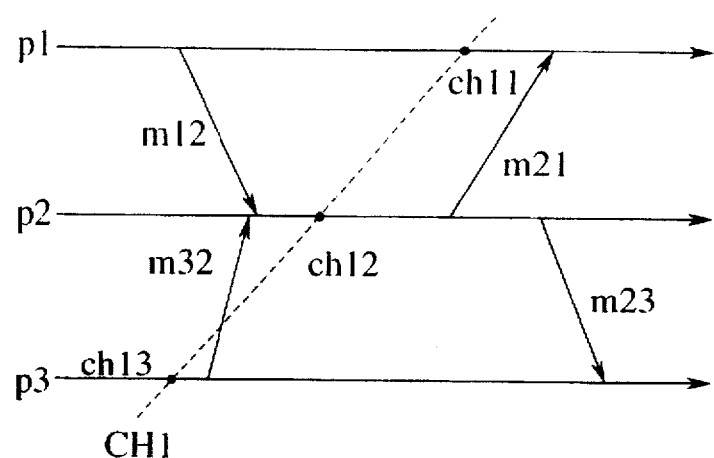
FIGS. 1A, 1B and 1C are diagrams showing examples of conventional distributed checkpoint timings in a case of using the message passing.
Figure 1B:
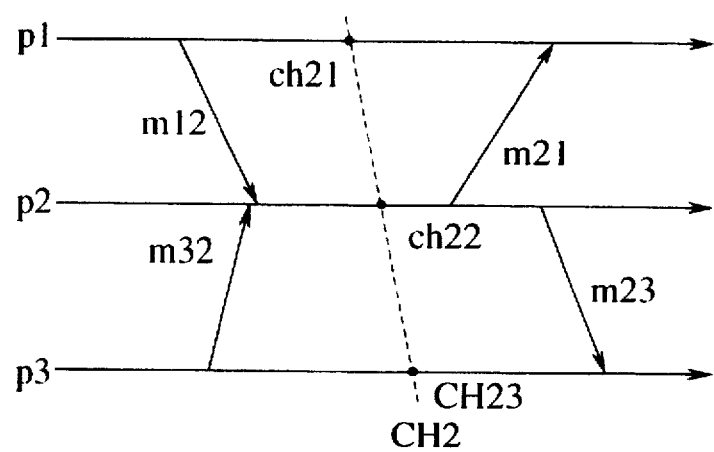
Figure 1C:
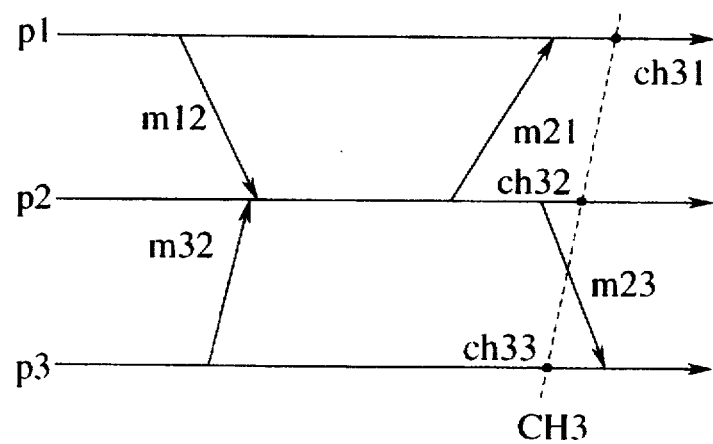
Figure 2:
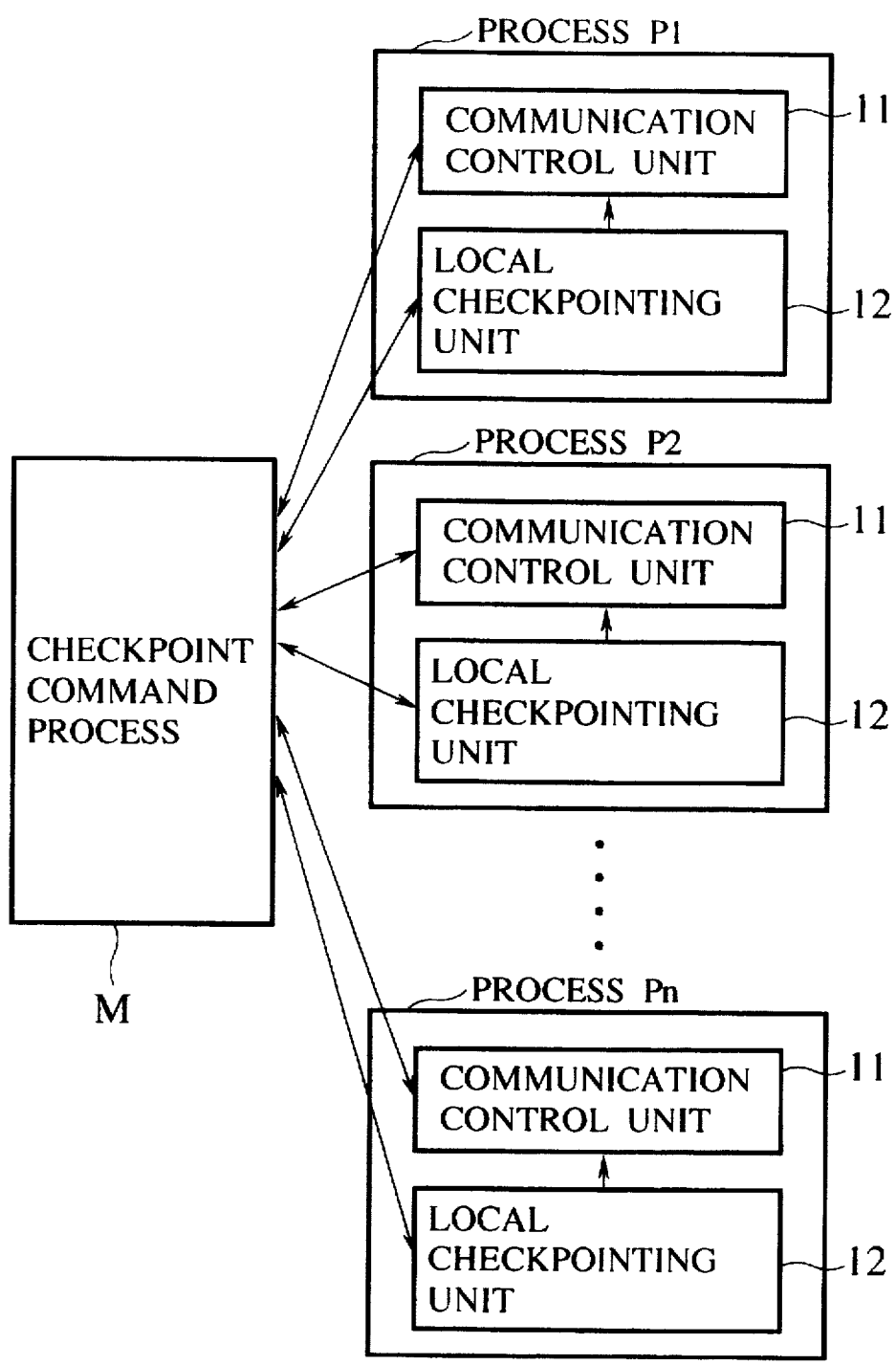
FIG. 2 is a block diagram showing a functional configuration of a distributed system to which the distributed checkpointing scheme of the first embodiment according to the present invention is applied.

FIG. 2 shows a functional configuration of a distributed system to which the distributed checkpointing scheme of this first embodiment is applied. This distributed system comprises a plurality of computers, which are operating in mutual cooperation. On these computers, a plurality of mutually related processes P1 to Pn are executed. The checkpointing timings for these processes P1 to Pn are given by a checkpoint command process M. Namely, the synchronous checkpoint as described above is used here.

The checkpoint command process M is executed on one computer in this distributed system, and realized as an operating system, or as a process independent from the operating system. The checkpoint command process M commands the local checkpointing timings to the processes P1 to Pn. A checkpointing command is issued regularly at an interval of several seconds, for example.

The checkpointing protocol is carried out by utilizing the two-phase scheme. At the first phase, the inter-process communication stop command is issued to each of the processes P1 to Pn. When the stopping of all the inter-process communications is confirmed, at the second phase, the local checkpointing is commanded to each of the processes P1 to Pn.

The processes P1 to Pn are operating while carrying out the inter-process communications. Each of these processes has a communication control unit 11 and a local checkpointing unit 12 as functions for the checkpointing control.

The communication control unit 11 is realized as a communication library or a communication manager on a micro-kernel, for example, and carries out the stopping and the resuming of the inter-process communications. In this case, the stopping of the inter-process communications is carried out in response to a communication stop command from the checkpoint command process M, and the resuming of the inter-process communications is carried out in response to a communication resume command from the local checkpointing unit 12.

The local checkpointing unit 12 carries out checkpointing of a local checkpoint of a corresponding process in response to a checkpointing command from the checkpoint command process M. When the checkpointing is finished, the local checkpointing unit 12 issues a communication resume command to the communication control unit 11.

Figure 3:
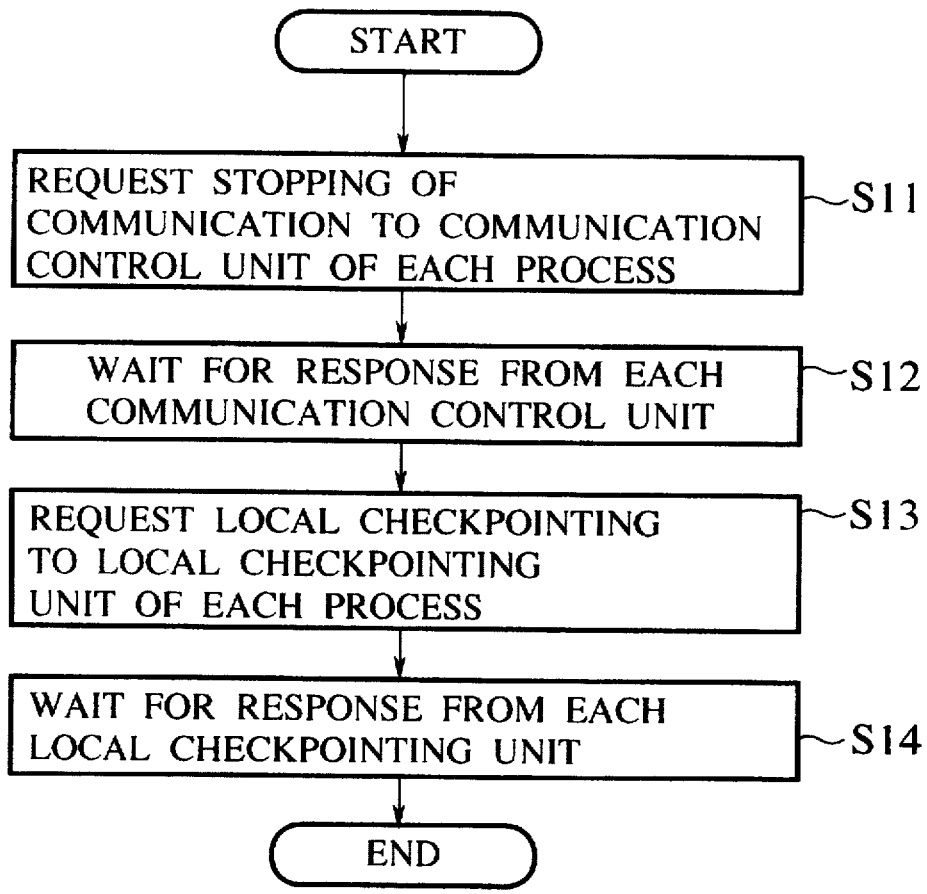
FIG. 3 is a flow chart of the operation by the checkpoint command process in the distributed system of FIG. 2.
Figure 4:
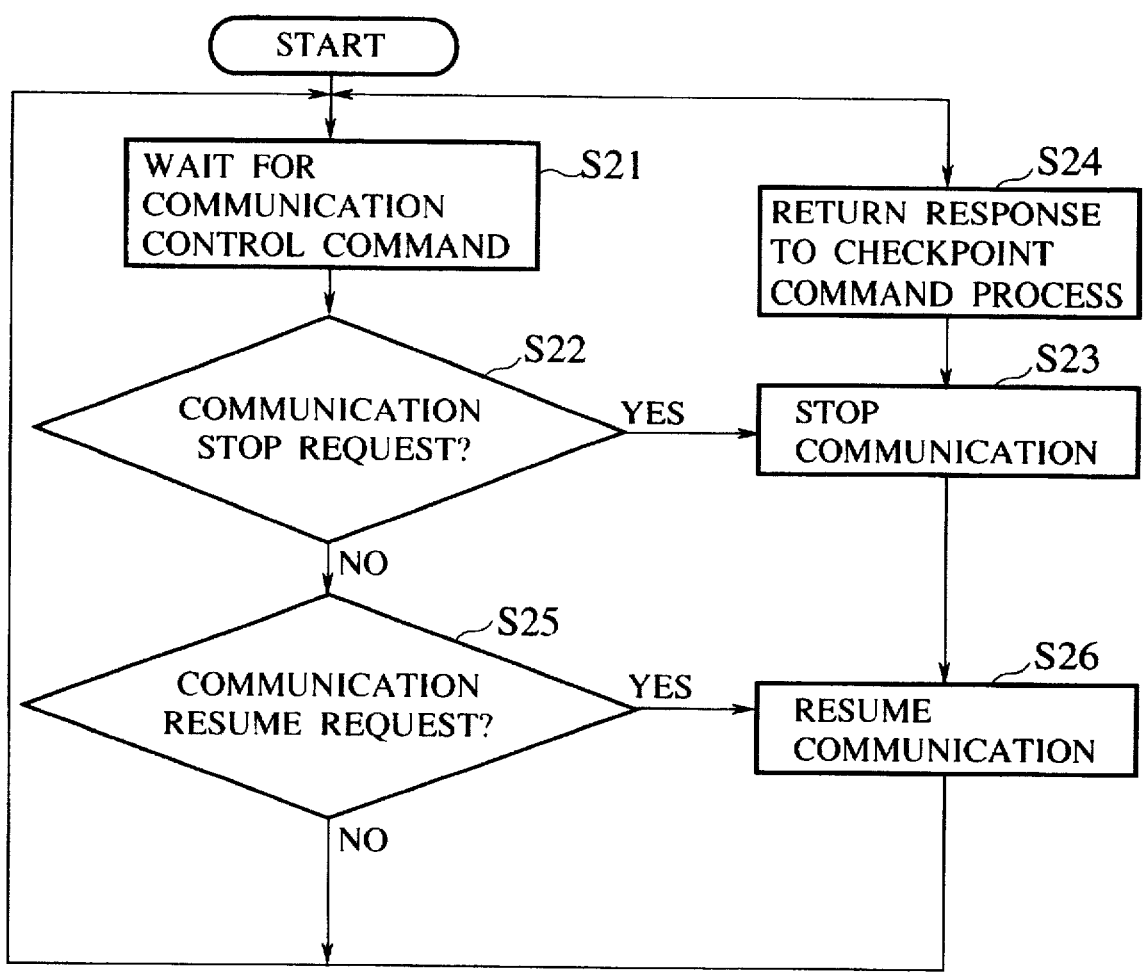
FIG. 4 is a flow chart of the operation by the communication control unit in the distributed system of FIG. 2.
Figure 5:
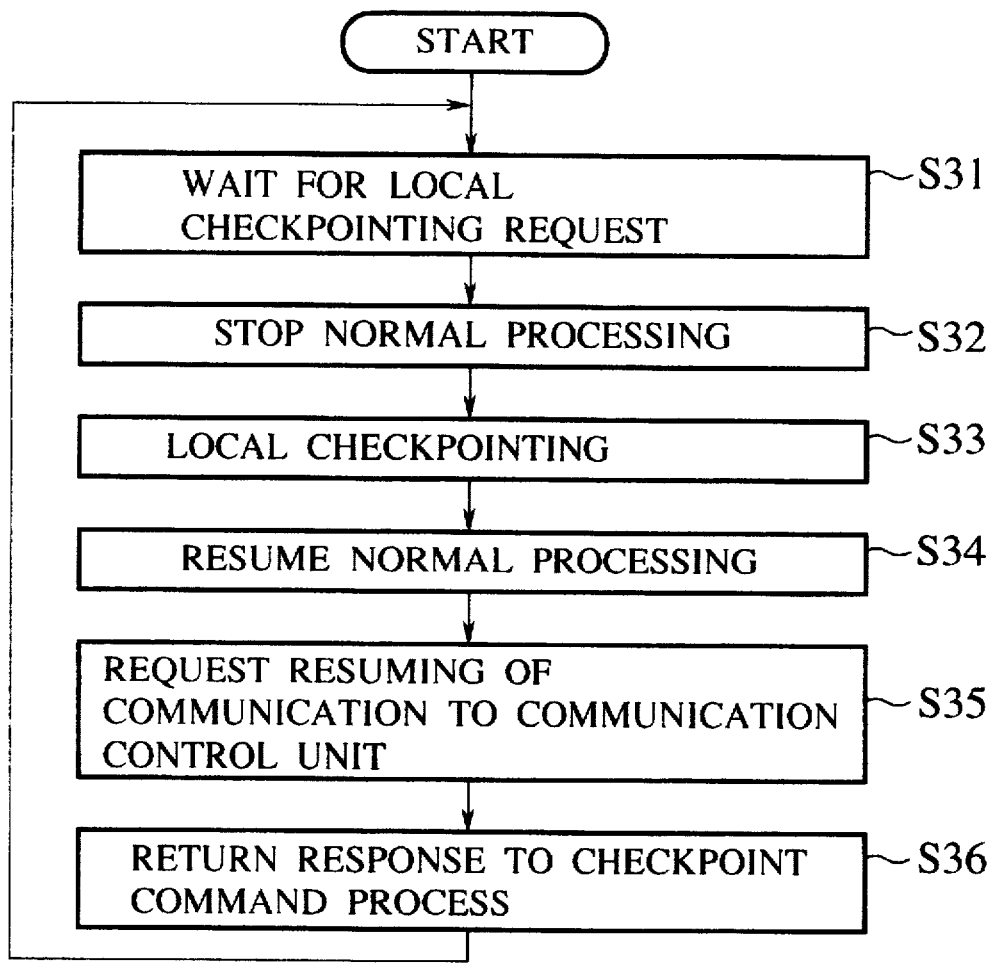
FIG. 5 is a flow chart of the operation by the local checkpointing unit in the distributed system of FIG. 2.

Now, with references to the flow charts of FIG. 3 to FIG. 5, a series of operations by these checkpoint command process M, communication control unit 11, and local checkpointing unit 12 at a time of distributed checkpointing will be described. FIG. 3 shows a flow chart of the operation by the checkpoint command process M, FIG. 4 shows a flow chart of the operation by the communication control unit 11, and FIG. 5 shows a flow chart of the operation by the local checkpointing unit 12.

At a time of distributed checkpointing, the checkpoint command process M notifies the communication stop command to the communication control unit 11 of each one of the related processes P1 to Pn, so as to request the stopping of communication (step S11).

The communication control unit 11 of each process is awaiting for the communication control command (step S21), and when the communication stop command is received (step S22 YES), the inter-process communications are stopped (step S23). Then, a response is returned to the checkpoint command process M, so as to notify that the inter-process communications are stopped (step S24).

The checkpoint command process M is awaiting for responses from all the communication control units 11 (step S12), and when all the responses are received, the local checkpointing request is issued to the local checkpointing unit 12 of each process (step S13).

The local checkpointing unit 12 is awaiting for the local checkpointing request (Step S31), and when the local checkpointing request is received, the normal processing of the corresponding process is stopped (step S32), and the local checkpointing is started (step S33), when the local checkpointing is finished, the local checkpointing unit 12 resumes the normal processing (Step S34), while requesting the resuming of communication to the communication control unit 11 (step S35).

When the communication resume request is received (step S25 YES), the communication control unit 11 resumes the inter-process communications (step S26).

In addition, the local checkpointing unit 12 returns a response to the checkpoint command process M, so as to notify the finish of the local checkpointing (step S36).

The checkpoint command process M is awaiting for responses from all the local checkpointing units 12 (step S14), and when all the responses are received, the distributed checkpointing is completed.

In this manner, in this first embodiment, the processing to stop the execution of the inter-process communications of the processes P1 to Pn is carried out at the first phase, and when the stopping of all the inter-process communications is confirmed, the normal processing is stopped at the second phase, and the checkpointing for each process is started. Then, the inter-process communication and the normal processing are resumed at each process for which the checkpointing is completed. In this case, only the inter-process communications are stopped during a period before the checkpointing starts.

For this reason, each process can carry out the normal processing up to a step for carrying out the inter-process communication, and is set in a waiting state for the first time when it reached to a step for carrying out the inter-process communication. Also, in a case where the process is operating under the multi-thread environment, even when a thread which carries out the inter-process communication is set in a waiting state, it is still possible for the other threads which are not related to the inter-process communication to continue operating. Consequently, it is possible to shorten the operation stopping time for the processes as a whole, compared with a conventional scheme of Plank et al., in which the checkpointing is started after all the operations of each process are stopped, and the resuming of the normal processing is commanded to each process only when the checkpointing is finished for all the processes.

Figure 6:
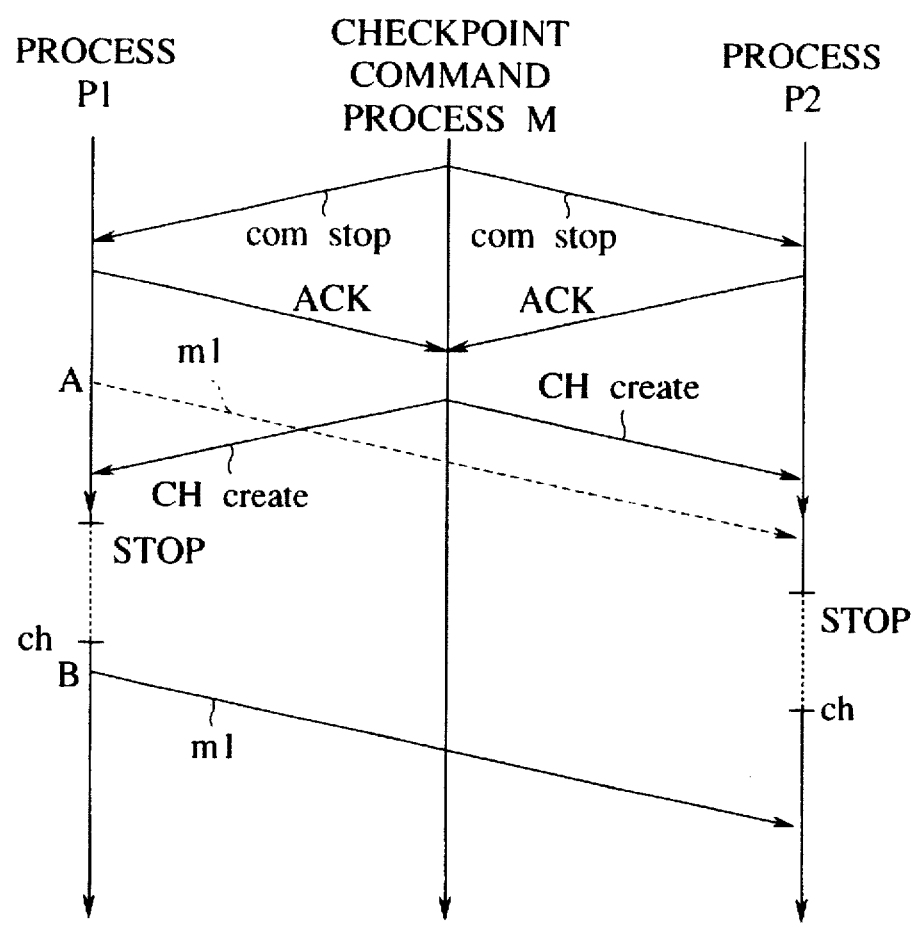
FIG. 6 is a diagram showing a relationship of the operations among two processes and the checkpoint command process in the distributed system of FIG. 2.

FIG. 6 shows a relationship of the operations among two processes P1 and P2 and the checkpoint command process M in this first embodiment.

In FIG. 6, "com stop" is the communication stop command which is issued from the checkpoint command process M at the first phase of the distributed checkpointing processing, and "ACK" is a response to "con stop" from each process. Also, "CH create" is the local checkpointing start command which is issued from the checkpoint command process M at the second phase of the distributed checkpointing processing.

In FIG. 6, even when the transmission request for the message m1 from the process P1 to the process P2 occurs at a timing A, the transmission of this message m1 is not carried out, and after the checkpointing processing is completed and the normal processing and the communication are resumed, the transmission of this message m1 is carried out at a timing B.

Consequently, the communication of the processes P1 and P2 between the respective local checkpoint set up timings ch of these processes P1 and P2 is prevented, and it becomes possible to carry out the distributed checkpointing in a state which maintains the consistency.

Also, as described above, even when "con stop" is issued, the processes P1 and P2 can carry out the processing other than the inter-process communication, so that a time for stopping the normal processing entirely can be shortened considerably.

Referring now to FIG. 7 to FIG. 10, the second embodiment of a scheme for checkpointing according to the present invention will be described in detail.

Figure 7:
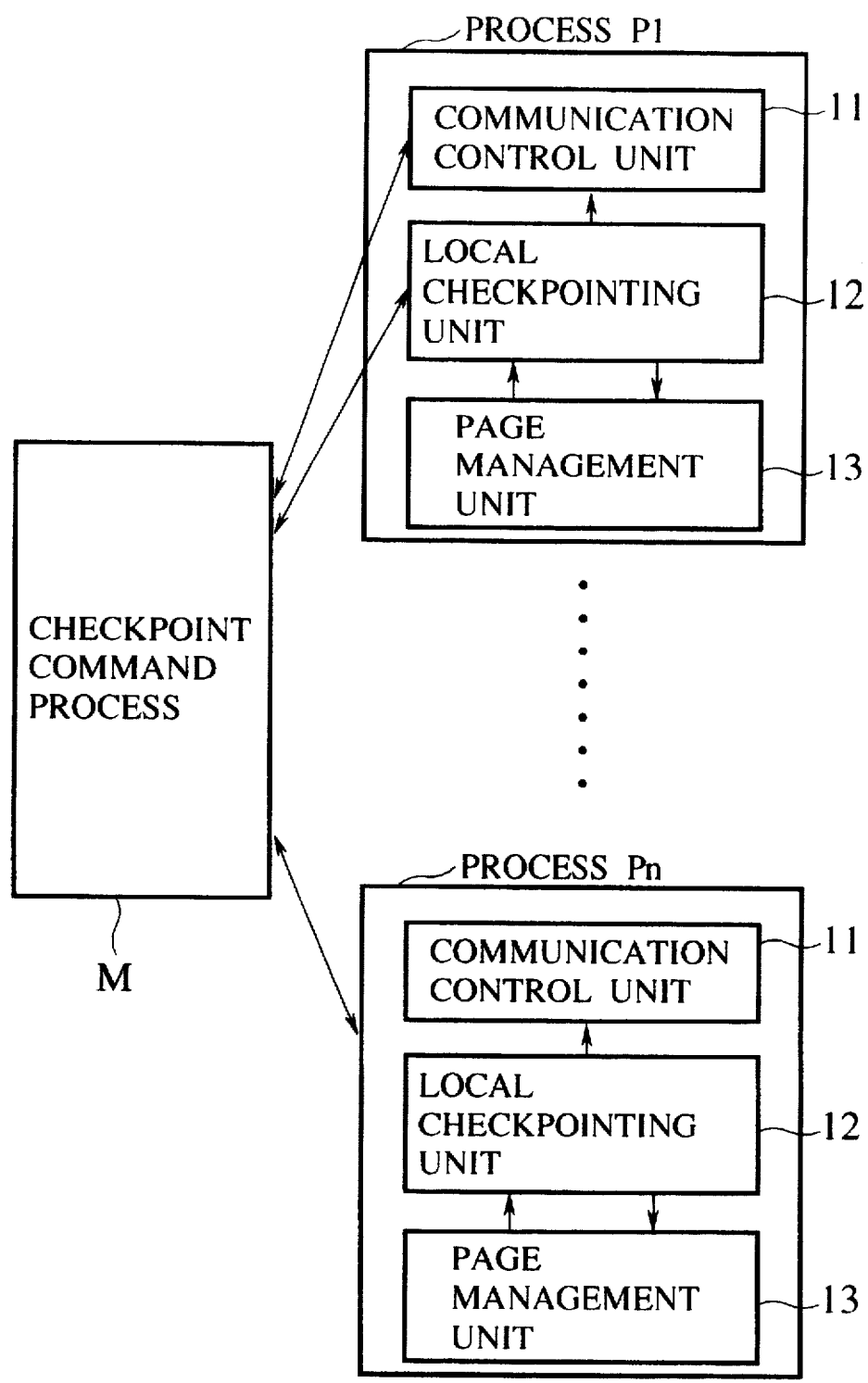
FIG. 7 is a block diagram showing a functional configuration of a distributed system to which the distributed checkpointing scheme of the second embodiment according to the present invention is applied.

FIG. 7 shows a functional configuration of a distributed system to which the distributed checkpointing scheme of this second embodiment is applied. In this distributed system, each one of the processes P1 to Pn has a page management unit 13 provided in addition to the communication control unit 11 and the local checkpointing unit 12, and the local checkpointing unit 12 is made to be capable of executing the local checkpointing processing in parallel to the normal processing.

The page management unit 13 has a function to detect a page in the memory address space to which the writing is carried out by the normal processing of the corresponding process, and is provided with a dirty page list for recording addresses of the pages (dirty pages) that have been rewritten since the previous checkpoint up until the present time.

The local checkpointing unit 12 stores only the pages recorded in the dirty page list as the local checkpoint information by using a function for local checkpointing, in parallel to the normal processing. By means of this, the local checkpointing time can be shortened, and the stopping time of the normal processing and the inter-process communications due to the distributed checkpointing can also be shortened.

Figure 8:
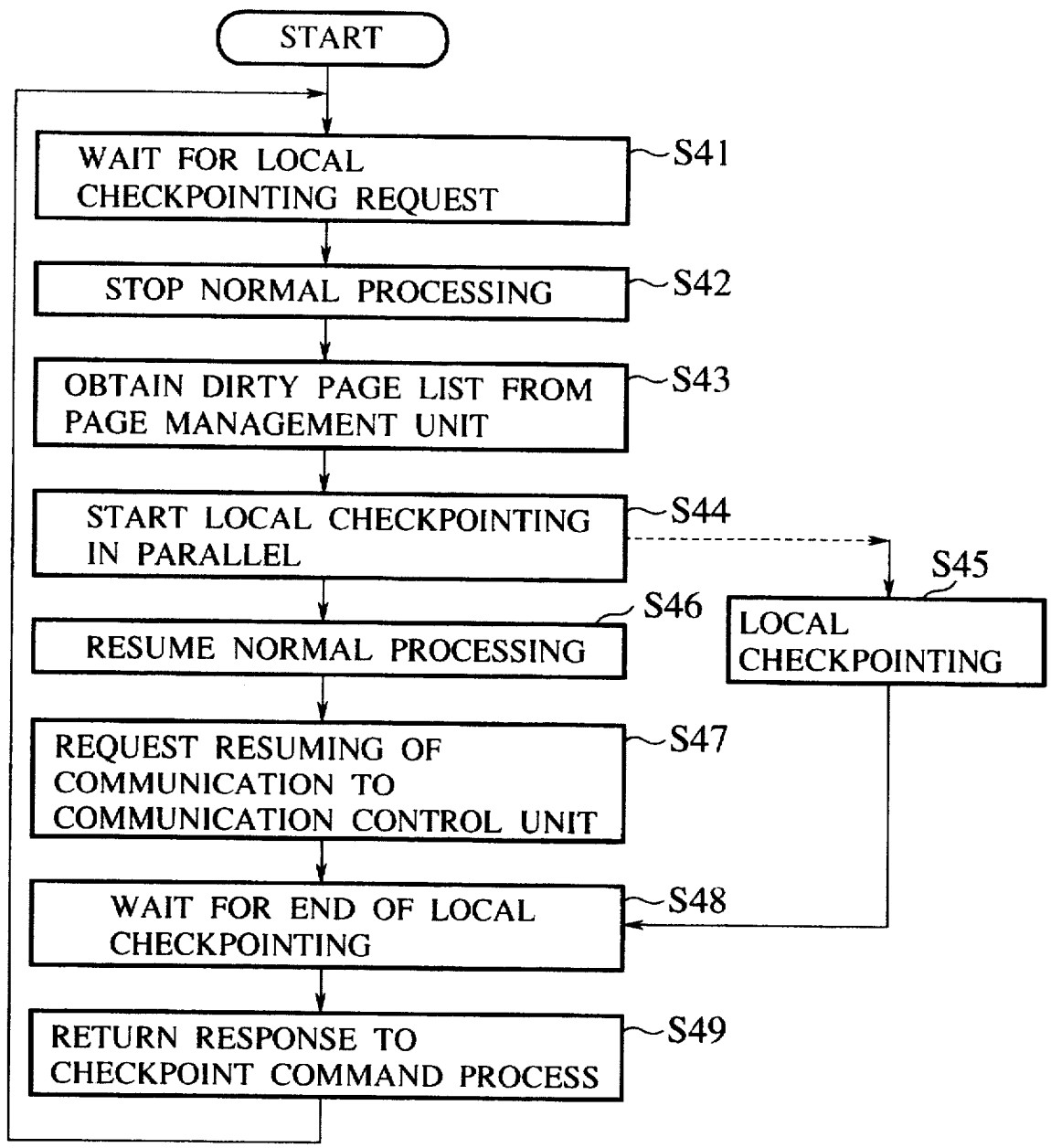
FIG. 8 is a flow chart of the operation by the local checkpointing unit in the distributed system of FIG. 2.
Figure 9:
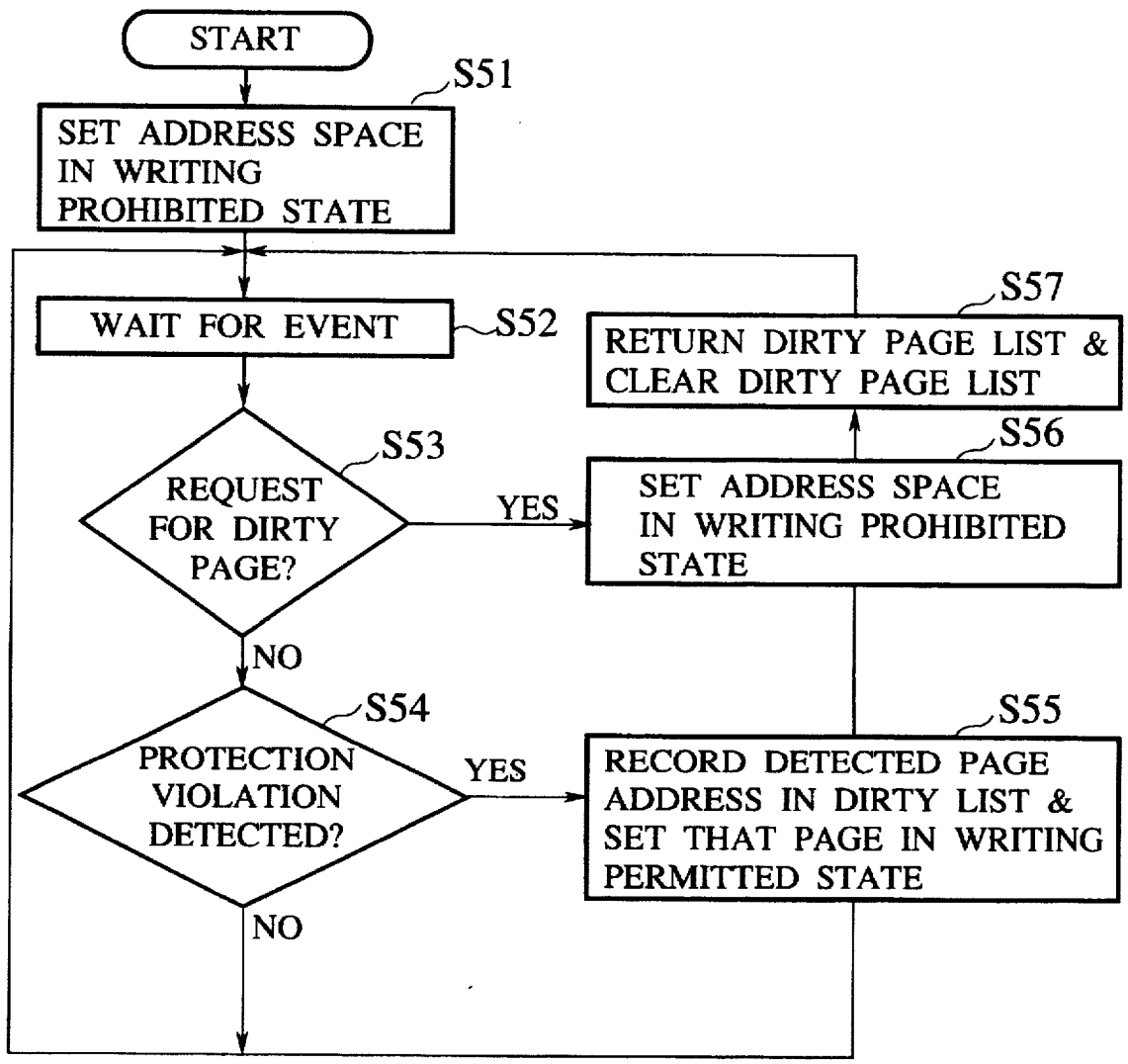
FIG. 9 is a flow chart of the operation by the page management unit in the distributed system of FIG. 2.

Now, with references to the flow charts of FIG. 8 and FIG. 9, a procedure for the distributed checkpointing in this second embodiment will be described. Here, FIG. 8 shows a flow chart of the operation by the local checkpointing unit 12, and FIG. 9 shows a flow chart of the operation by the page management unit 13. In this second embodiment, the checkpoint command process M and the communication control unit 11 carry out the operations similar to those in the first embodiment described above.

The page management unit 13 sets the address space in a writing prohibited state by using the function of the operating system (OS) at a start of the processing of the corresponding process (step S51), and an event is awaited (step S52). When a writing with respect to a certain page is carried out during the normal processing, a page protection violation is caused by means of the OS function. When the page management unit 13 detects this page protection violation (step S54 YES), the page management unit 13 records an address of that page in the dirty page list, and sets this page in a writing permitted state so as to permit the writing by the normal processing (step S55).

Also, when the dirty page list request is issued from the local checkpointing unit 12 (step S53 YES), the page management unit 13 sets the address space in a writing prohibited state (step S56), and returns the content of the dirty page list while clearing the dirty page list (step S57).

When the local checkpointing request is received from the checkpoint command process M (step S41), the local checkpointing unit 12 stops the normal processing of the process (step S42). Then, the local checkpointing unit 12 requests the dirty page list to the page management unit 13 and obtains the dirty page list (step S43). After that, the local checkpointing unit 12 starts the processing to store only the pages recorded in the dirty page list as the local checkpoint information (step S44), and in parallel to the execution of the local checkpointing processing (step S45), the normal processing is resumed (step S46) and the resuming of communication is requested to the communication control unit 11 (step S47).

Then, after the end of the local checkpointing is awaited (step S48), at a point where the local checkpointing carried out in parallel to the normal processing is finished, the local checkpointing unit 12 returns a response to the checkpoint command process M (step S49).

By this procedure, a period for which the normal processing is stopped is only since the dirty page list is obtained until the local checkpointing is started, so that the stopping time of the inter-process communications and the other normal processing can be shortened in this second embodiment.

Figure 10:
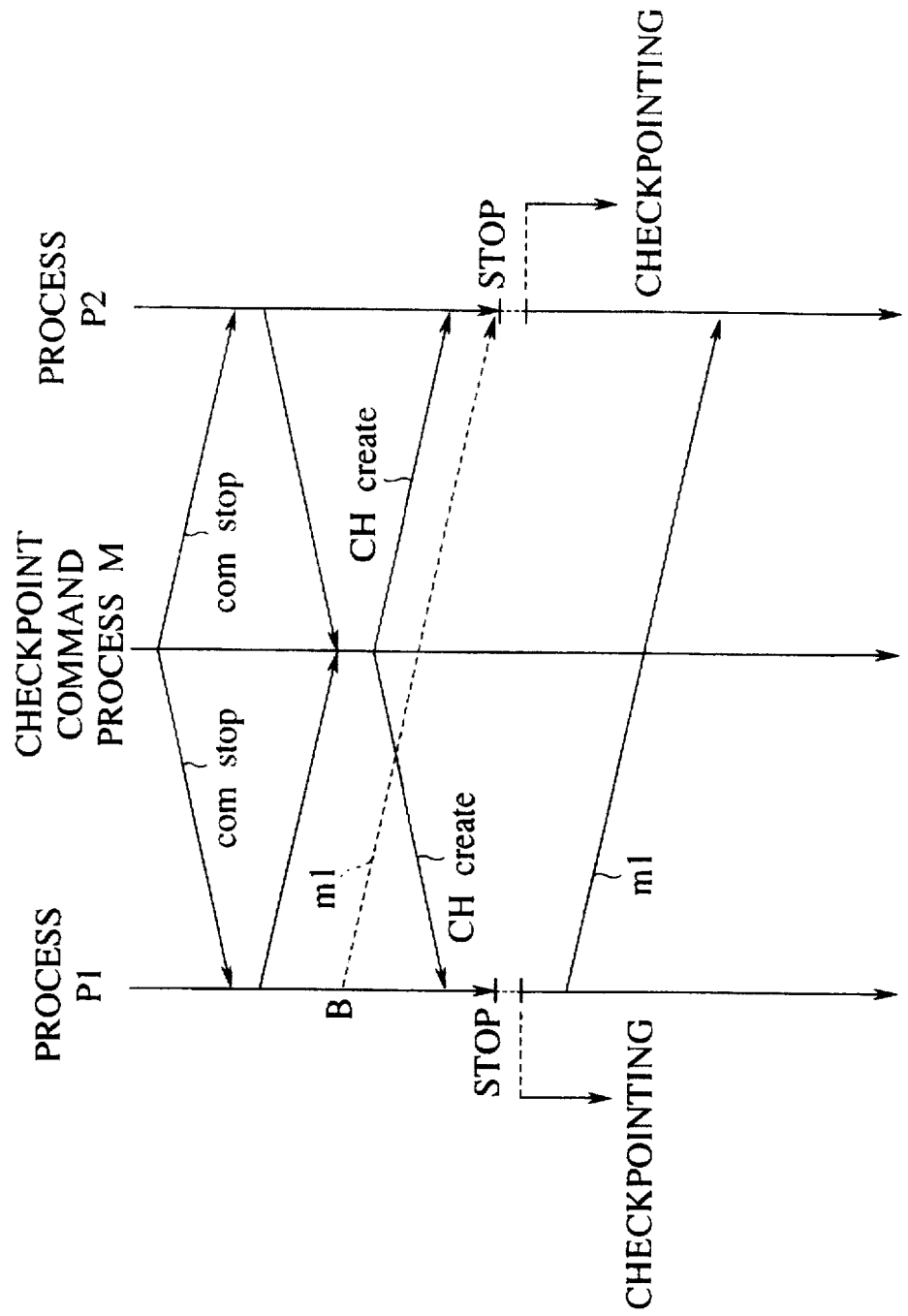
FIG. 10 is a diagram showing a relationship of the operations among two processes and the checkpoint command process in the distributed system of FIG. 7.

FIG. 10 shows a relationship of the operations among two processes P1 and P2 and the checkpoint command process M in this second embodiment.

As can be seen in FIG. 10, the stopping time is shortened compared with a case of the first embodiment shown in FIG. 6, and the delay of the inter-process communication is also reduced.

Referring now to FIG. 11 to FIGS. 14A and 14B, the third embodiment of a scheme for checkpointing according to the present invention will be described in detail.

In the second embodiment, when the writing is carried out by the normal processing while the local checkpointing processing is carried out in parallel to the normal processing and the dirty page to which this writing is carried out is not stored in the checkpoint, the normal processing is stopped until this dirty page is stored. In this regard, in this third embodiment, the local checkpointing unit 12 has an additional function to store an unstored dirty page with priority, when the writing request to the unstored dirty page is issued by the normal processing.

Figure 11:
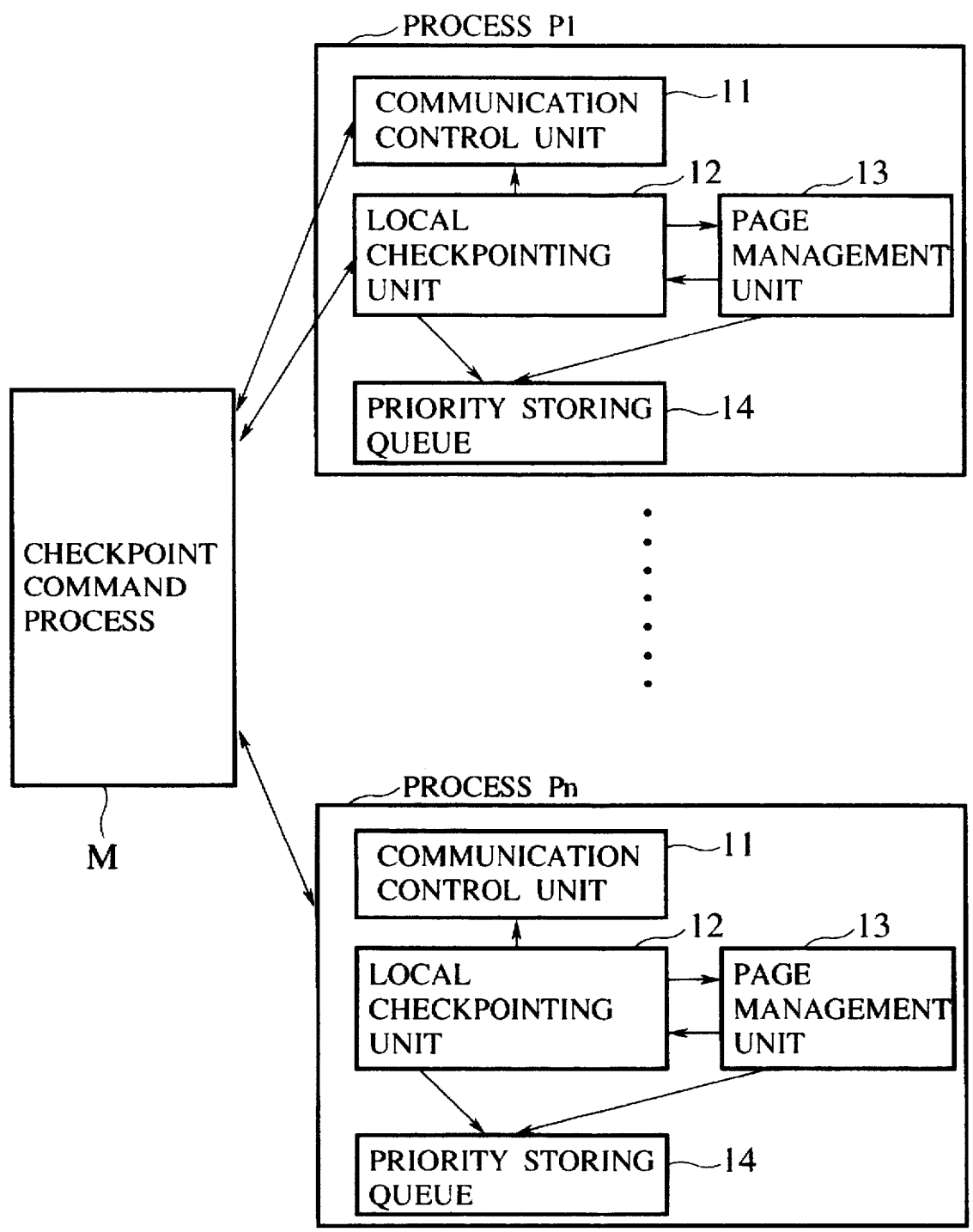
FIG. 11 is a block diagram showing a functional configuration of a distributed system to which the distributed checkpointing scheme of the third embodiment according to the present invention is applied.

FIG. 11 shows a functional configuration of a distributed system to which the distributed checkpointing scheme of this third embodiment is applied. In this distributed system, each one of the processes P1 to Pn has a priority storing queue 14 provided in addition to the communication control unit 11, the local checkpointing unit 12, and the page management unit 13, where the address of the page to be stored with priority is to be queued in this priority storing queue 14.

Figure 12:
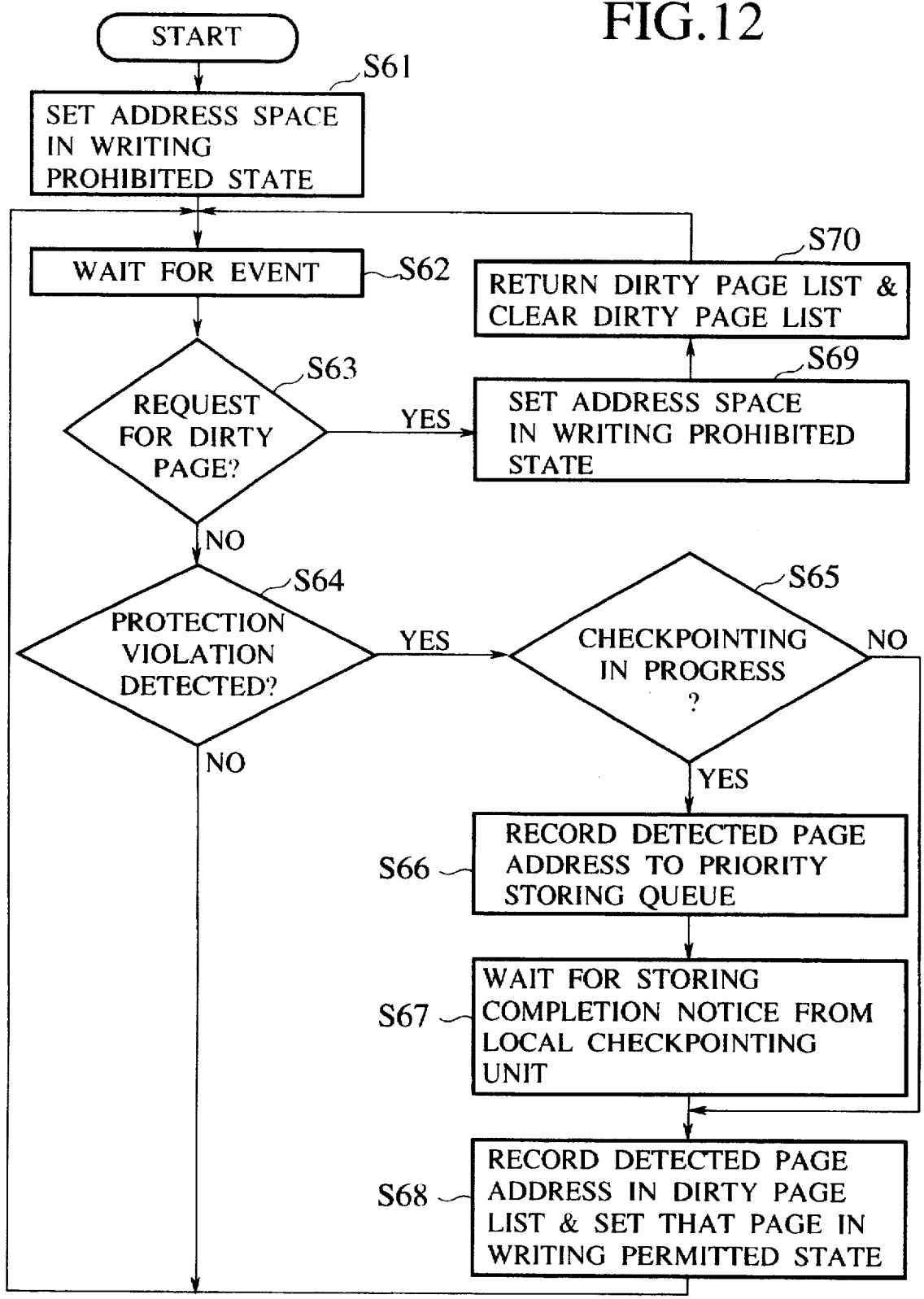
FIG. 12 is a flow chart of the operation by the page management unit in the distributed system of FIG. 11.

Now, with references to the flow charts of FIG. 12 and FIG. 13, a procedure for the distributed checkpointing in this third embodiment will be described. Here, FIG. 12 shows a flow chart of the operation by the page management unit 13, and FIG. 13 shows a flow chart of the operation for the local checkpointing processing by the local checkpointing unit 12 which corresponds to the step S45 of FIG. 8. In this third embodiment, the checkpoint command process M and the communication control unit 11 carry out the operations similar to those in the first embodiment described above.

The page management unit 13 sets the address space in a writing prohibited state by using the function of the operating system (OS) at a start of the processing of the corresponding process (step S61), and an event is awaited (step S62).

When the dirty page list request is issued from the local checkpointing unit 12 (step S63 YES), the page management unit 13 sets the address space in a writing prohibited state (step S69), and returns the content of the dirty page list while clearing the dirty page list (step S70), similarly as in the second embodiment.

Also, when a writing with respect to a certain page is carried out during the normal processing, a page protection violation is caused by means of the OS function. When the page management unit 13 detects this page protection violation (step S64 YES), the page management unit 13 checks whether the local checkpointing by the local checkpointing unit 12 is in progress or not (step S65). If so, the address of the detected page is recorded in the priority storing queue (step S66), and the storing completion notice from the local checkpointing unit 12 is awaited (step S67). After the storing completion notice is received, the page management unit 13 records the detected page address in the dirty page list, and sets this page in a writing permitted state (step S68). On the other hand, when the local checkpointing is not in progress (step S65 NO), the steps S66 and S67 are skipped, and the page management unit 13 only records the detected page address in the dirty page list, and sets this page in a writing permitted state (step S68).

The local checkpointing unit 12 completes the local checkpointing when there is no more unstored dirty page during the local checkpointing. If there is an unstored dirty page (step S71 YES), whether the page address is registered in the priority storing queue 14 or not is checked (step S72), and if so, that priority storing page is stored with priority (step S73), and the storing completion is notified to the page management unit 13 (step S74). On the other hand, when there is no page information in the priority storing queue 14 (step S72 NO), the page address is for that unstored page is obtained from the dirty page list, and this page is stored (step S75).

Figure 14A:
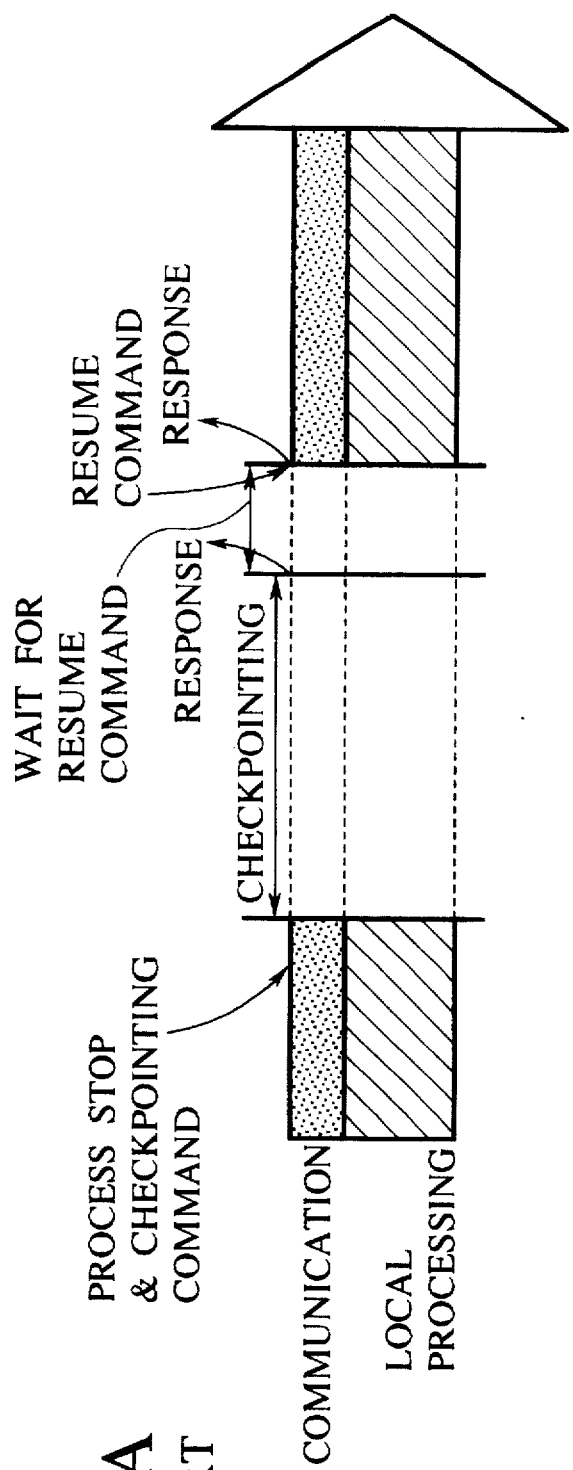
FIGS. 14A and 14B are timing charts for the checkpointing processing in a case of the conventional scheme and a case of the third embodiment of the present invention, respectively.
Figure 14B:
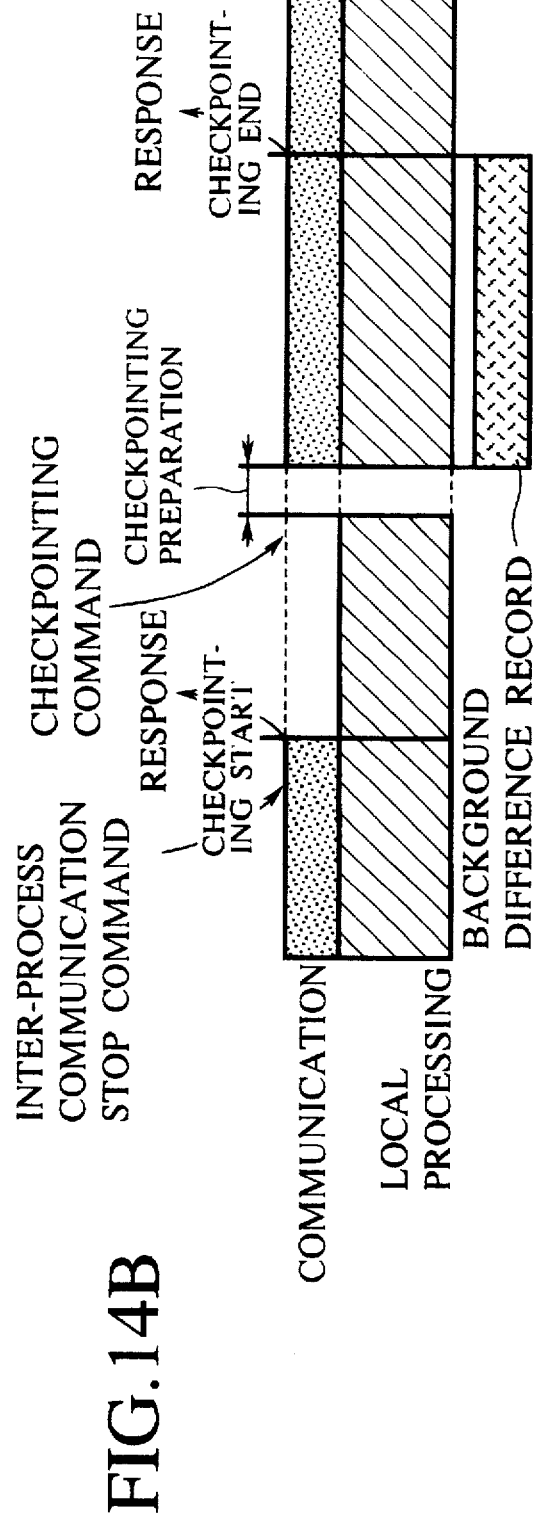

To illustrate the effect of this third embodiment, FIG. 14A shows a case of the conventional scheme of Plank et al., while FIG. 14B shows a case of this third embodiment. In contrast to a case of the conventional scheme shown in FIG. 14A where all the communication and normal processing are stopped during the checkpointing, it can be seen in FIG. 14B that the stopping time of the normal processing is considerably shortened in this third embodiment. Also, by carrying out the checkpointing in parallel to the normal processing, the stopping time of the normal processing and the inter-process communication is shortened further in this third embodiment.

Referring now to FIG. 15 to FIG. 20, the fourth embodiment of a scheme for checkpointing according to the present invention will be described in detail.

Figure 15:
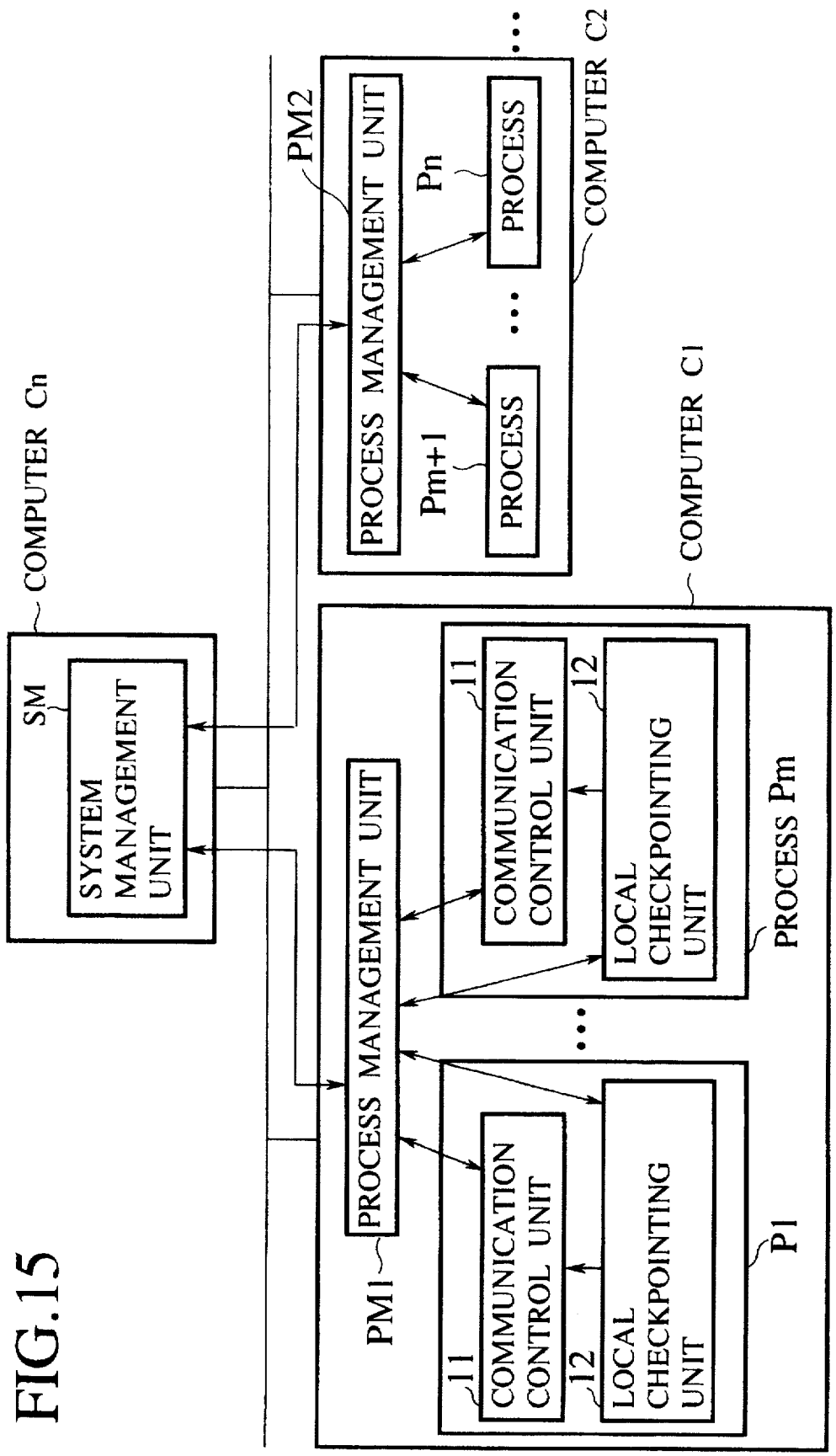
FIG. 15 is a block diagram showing a functional configuration of a distributed system to which the distributed checkpointing scheme of the fourth embodiment according to the present invention is applied.

FIG. 15 shows a functional configuration of a distributed system to which the distributed checkpointing scheme of this fourth embodiment is applied. In FIG. 15, a plurality of computers C1 to Cn are connected to the network, and process management units PM1, PM2, etc. for managing processes on the respective computers are provided on these computers C1 to Cn. Also, each process has the communication control unit 11 and the local checkpointing unit 12 similarly as in the first embodiment. In addition, one computer Cn has a system management unit SM for issuing a checkpointing request to each of the process management units PM1, PM2, etc. on these computers.

Figure 16:
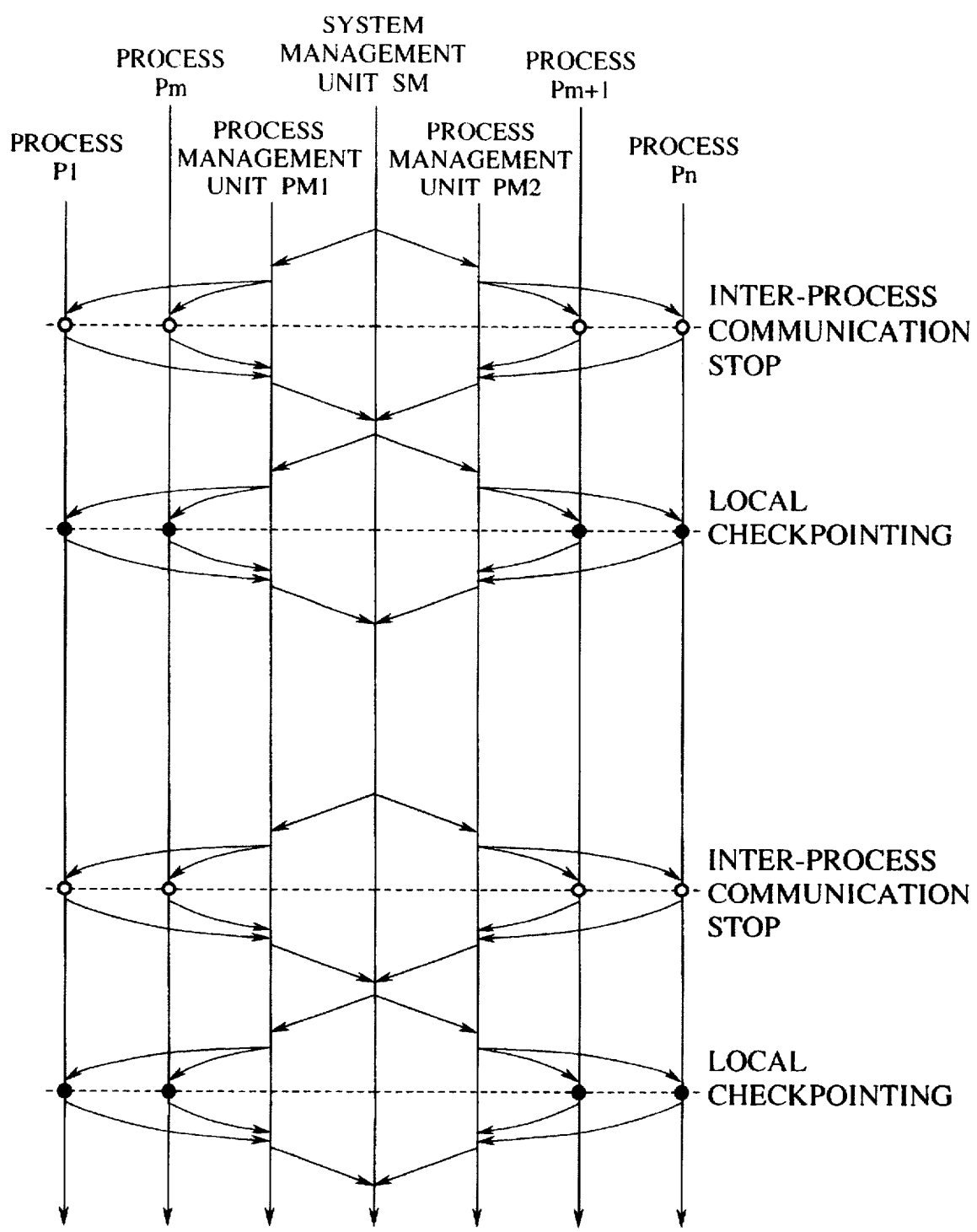
FIG. 16 is a diagram showing a relationship of the operations among the system management unit, the process management units, and the processes in the distributed system of FIG. 15.
Figure 17:
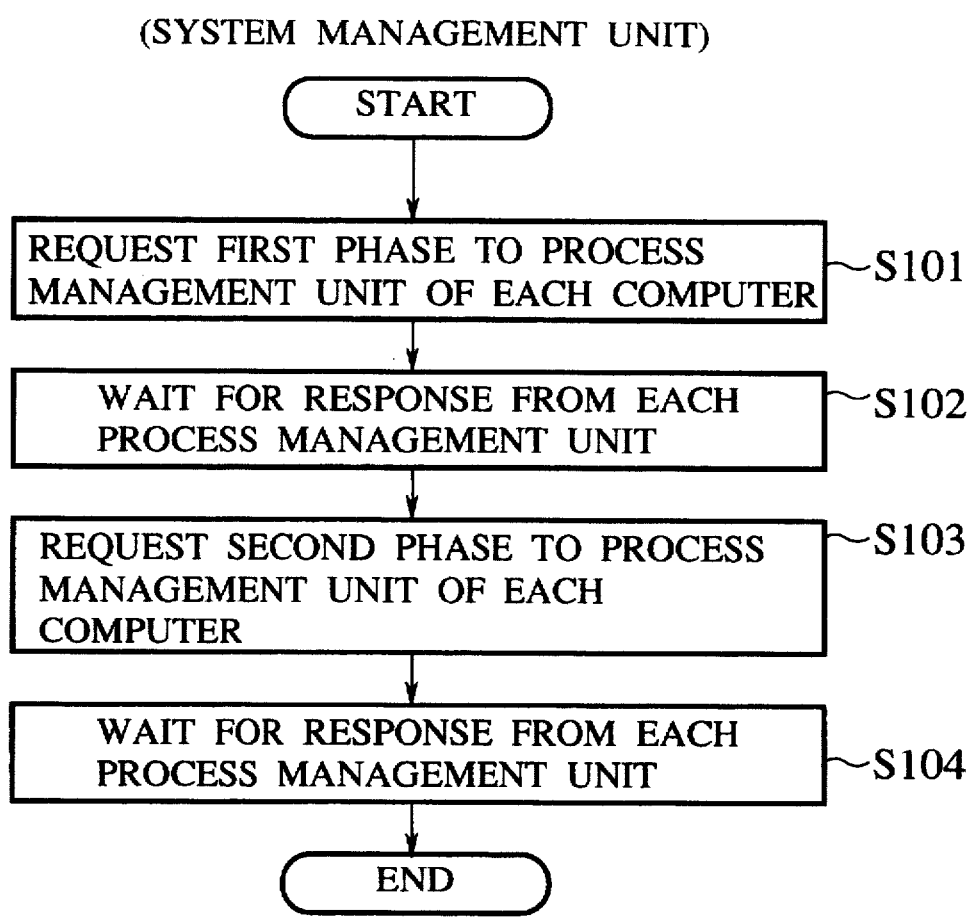
FIG. 17 is a flow chart of the operation by the system management unit in the distributed system of FIG. 15.
Figure 18:
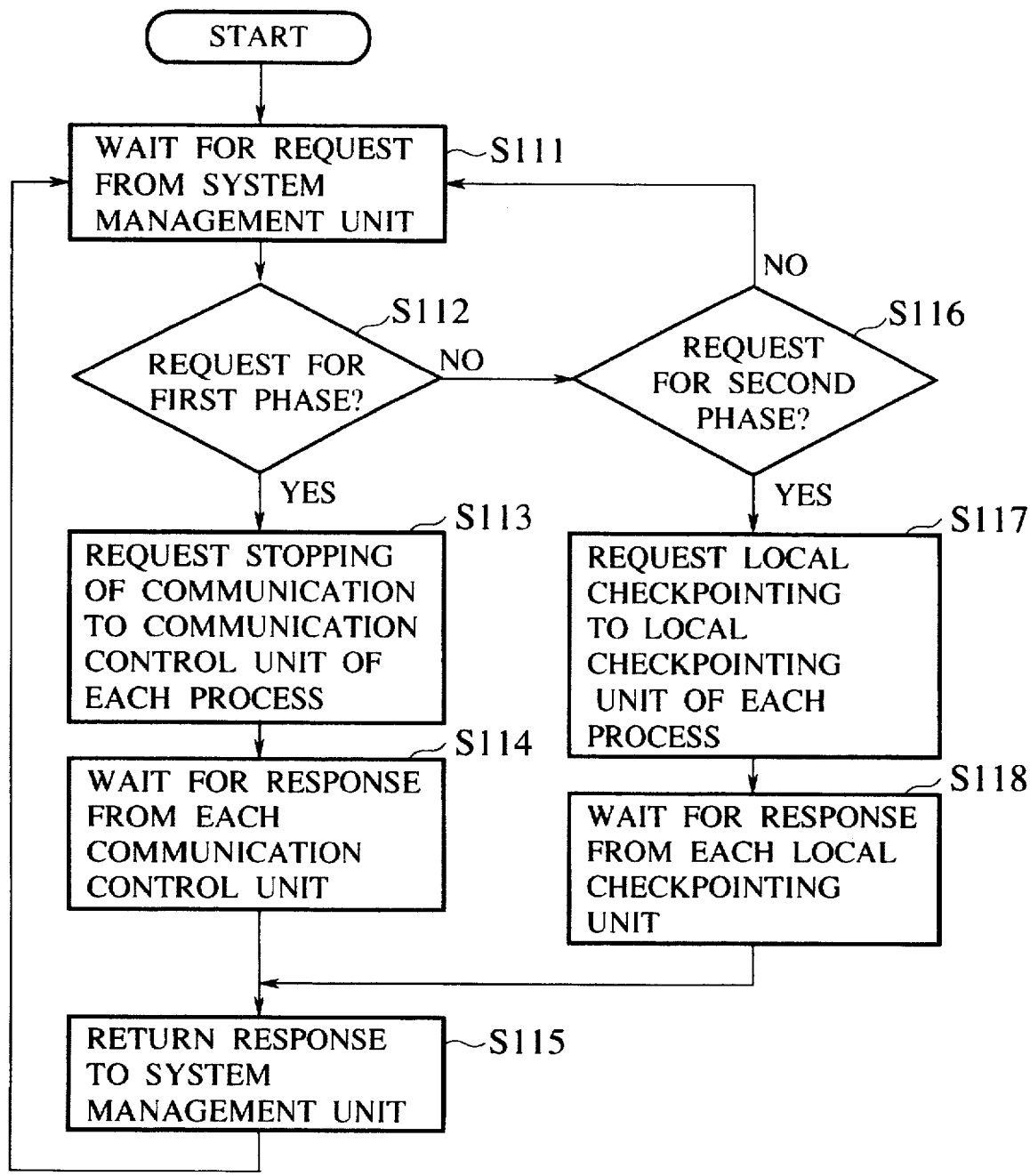
FIG. 18 is a flow chart of the operation for the process management unit in the distributed system of FIG. 15.

FIG. 16 shows a flow of messages for the checkpointing in this system of FIG. 15. Here, the entire protocol comprises two phases, where the inter-process communications are stopped at the first phase, and the local checkpointing is carried out at the second phase. Also, FIG. 17 shows a flow chart of the operation by the system management unit SM, while FIG. 18 shows a flow chart for the operation by each process management unit PM (PM1, PM2, etc.). In this fourth embodiment, the communication control unit 11 and the local checkpointing unit 12 carry out the operations similar to those in the first embodiment described above.

The system management unit SM requests the first phase of the checkpointing to each process management unit PM on each computer (step S101). Each process management unit PM is awaiting for a request from the system management unit SM (step S111), and when the request for the first phase is received (step S112 YES), each process management unit PM requests the stopping of the inter-process communications to the communication control unit 11 of each corresponding process inside the same computer (step S113). Each communication control unit 11 then stops the inter-process communications, and returns a response so as to notify the stopping of the inter-process communications.

Each process management unit PM is awaiting for a response from each corresponding communication control unit 11 (step S114), and when all the responses from all the communication control units 11 are received, each process management unit PM returns a response to the request for the first phase to the system management unit SM (step S115).

The system management unit SM is awaiting for responses from each process management unit PM (step S102), and when all the responses from all the process management units PM are received, the system management unit SM issues a request for the second phase of the checkpointing to each process management unit PM on each computer (step S103).

Each process management unit PM is awaiting for a request from the system management unit SM (step S111), and when the request for the second phase is received (step S116 YES), each process management unit PM requests the local checkpointing to the local checkpointing unit 12 of each corresponding process inside the same computer (step S117). When the local checkpointing request is received, the local checkpointing unit 12 stops the normal processing of the corresponding process, and starts the local checkpointing. Then, when the local checkpointing is finished, the local checkpointing unit 12 resumes the normal processing while requesting the resuming of communication to the communication control unit 11. In addition, the local checkpointing unit 12 returns a response to the process management unit PM so as to notify the end of the local checkpointing.

Each process management unit PM is awaiting for a response from each local checkpointing unit 12 (step S118), and when all the responses from all the local checkpointing units 12 are received, each process management unit PM returns a response to the request for the second phase to the system management unit SM (step S115).

The system management unit SM is awaiting for responses from each process management unit PM (step S104), and when all the responses from all the process management units PM are received, the checkpointing processing is completed.

By this procedure, it becomes possible to realize the distributed checkpointing while managing a plurality of processes on the distributed system efficiently.

Now, with references to FIGS. 19A and 19B and FIG. 20, a procedure for stopping each inter-process communication in this fourth embodiment will be described. Each process has a communication stop flag, and the communication control unit 11 sets this communication flag in response to the communication stop request from the process management unit PM, or resets this communication flag in response to the communication resume request from the local checkpointing unit 12.

In a case where each process carries out the message passing or the file input/output, each process issues a communication system call with respect to the OS. In a case of executing this communication system call, if the communication stop flag is set, it is awaited until the communication stop flag is reset. Here, for the message passing, only the message transmission is stopped, and for the file input/output, only the file output is stopped.

As for the shared memory, a writing into the shared memory is prohibited. Here however, unlike the message passing and the file input/output, an access is made similarly as a normal memory access rather than issuing the system call. For this reason, at a time of setting the communication stop flag, the shared memory is set in a writing prohibited state by the function provided by the OS. When a writing into the shared memory occurs in this state, the page fault is caused, so that if the communication stop flag is not set by that processing routine, the writing prohibition is released and the writing is permitted. If the communication stop flag is already set, it is awaited until the communication stop flag is reset.

Also, in the message passing, even when the system call for the message transmission is executed, there is a case in which the actual transmission is delayed by the OS. Exemplary timings in this case are shown in FIGS. 19A and 19B.

Figure 19B:
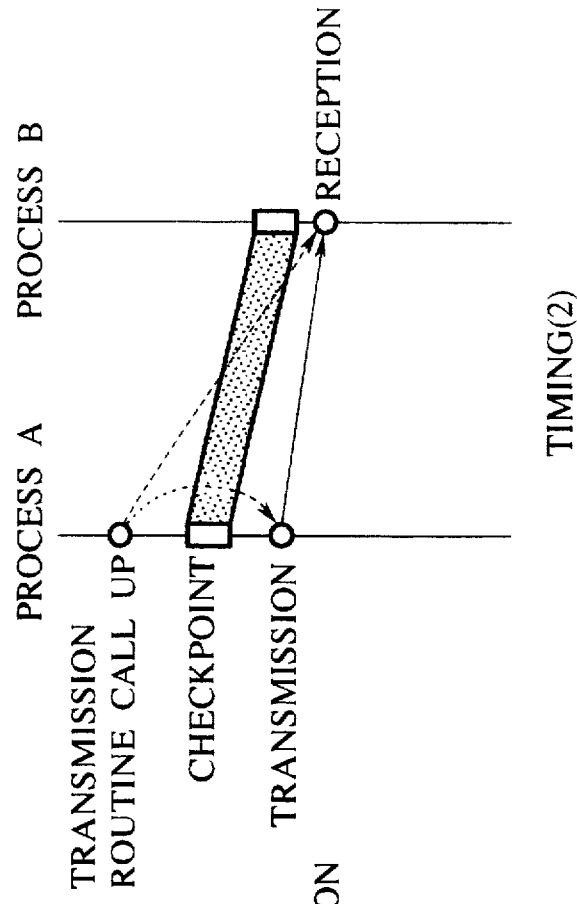
FIGS. 19A and 19B are diagrams showing exemplary timings in a case of delayed message transmission in the fourth embodiment of the present invention.
Figure 19A:
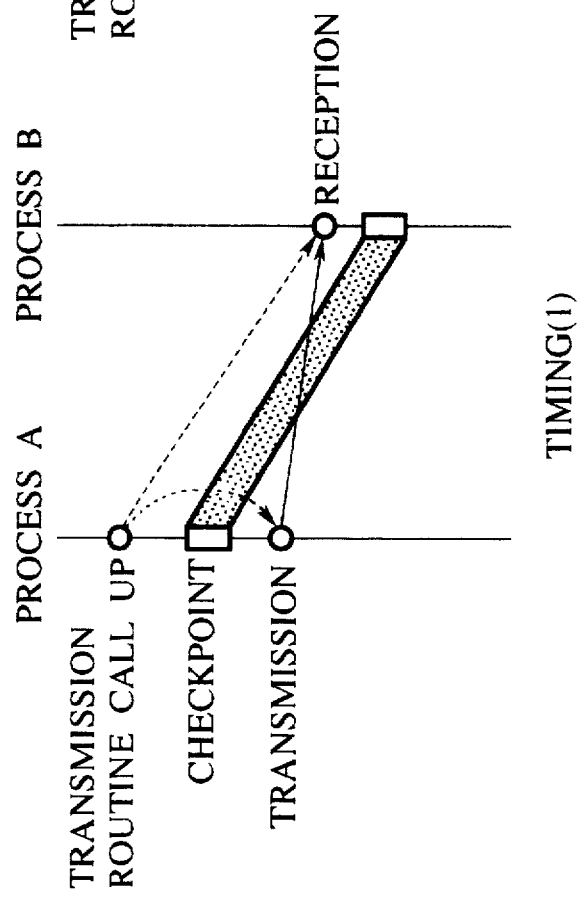

FIG. 19A shows a case in which the checkpointing is started after the process A issued the transmission system call, and the checkpointing and the actual transmission are carried out by the OS, while the process B carries out the checkpointing after the message is received. In this case, as shown in FIG. 19A, it appears as if there exists a "message which is transmitted but not yet received". However, when a case of actually restarting from the checkpoints is considered, the processes restart from a state after the transmission system call is issued, so that it is going to be the same processing as that for transmitting at a timing indicated by a dashed line, and neither transmission nor reception is going to be carried out after the restart, and consequently no contradiction arises.

FIG. 19B shows a case in which the checkpointing is carried out at both processes A and B after the process A issued the transmission system call, and the actual message transmission is carried out after that. When a trouble occurs and the processes are restarted from the checkpoints, the process A completes the message transmission while the process B is set in a reception state, so that they are inconsistent checkpoints.

Figure 20:
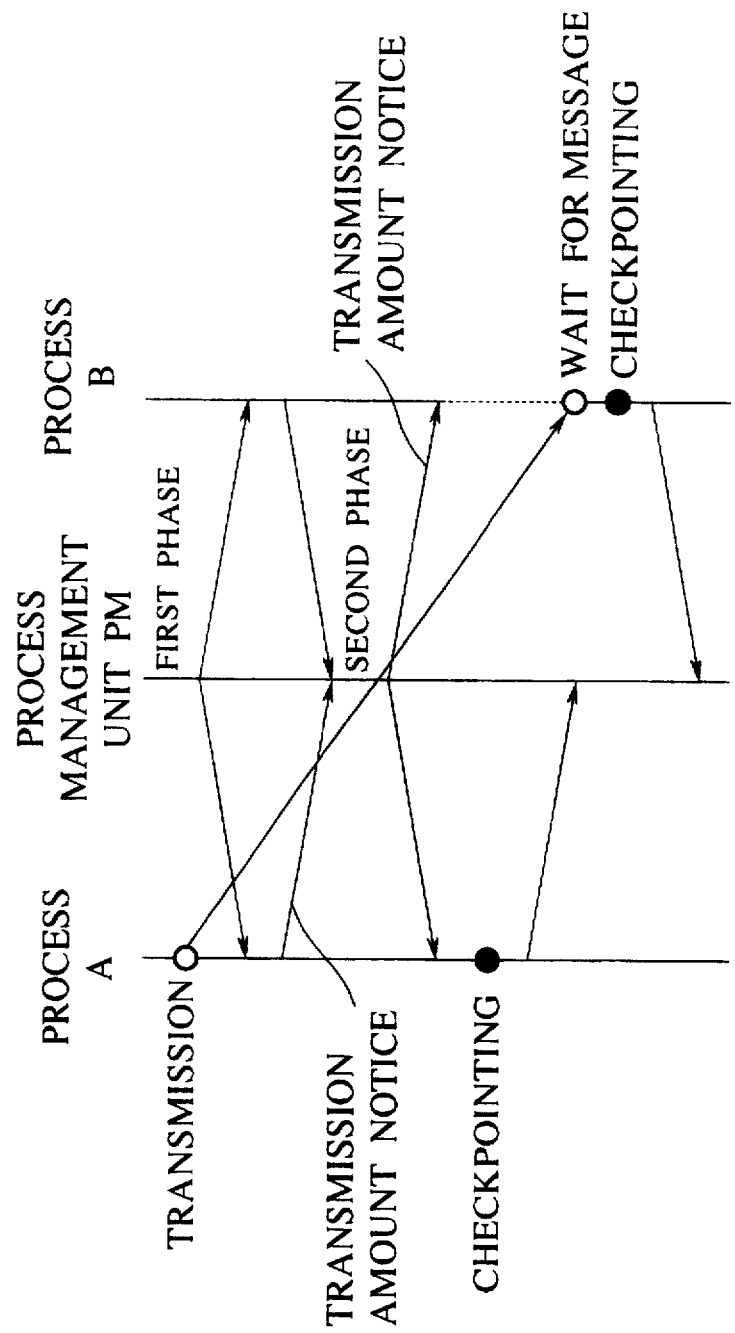
FIG. 20 is a diagram showing an exemplary timing for a processing to deal with a case of delayed message transmission in the fourth embodiment of the present invention.

FIG. 20 shows a processing for resolving this problem in FIG. 19B. At a time of response in the first phase of the checkpointing, the process A notifies a transmission amount transmitted to the process B. This transmission amount is notified to the process B by the request in the second phase via the process management unit PM and the system management unit SM. The process B delays the local checkpointing until data of the notified transmission amount are received. By means of this processing, the timing as shown in FIG. 19B can be prevented, so that it becomes possible to realize the consistent distributed checkpointing. Note that FIG. 20 is for a case where the processes A and B are on the same computer. When the processes A and B are on different computers, the similar processing is carried out by the protocol shown in FIG. 16.

Note also that the OS often provides the message passing based on a reliable protocol and the message passing based on unreliable protocol. The former is the message passing without a lost message, whereas the latter is the message passing in which a lost message could occur. For the reliable protocol, it suffices to carry out the consistent checkpointing according to the above described procedure.

It is also possible to use the above described procedure for the unreliable protocol as well, but since the lost message is allowed, it suffices to guarantee that there is no "message which is transmitted but not yet received". To this end, it is possible to simply stop the transmission alone instead of carrying out the exchange of the transmission amount as described above.

Referring now to FIG. 21 to FIGS. 25A and 25B, the fifth embodiment of a scheme for checkpointing according to the present invention will be described in detail.

Figure 21:
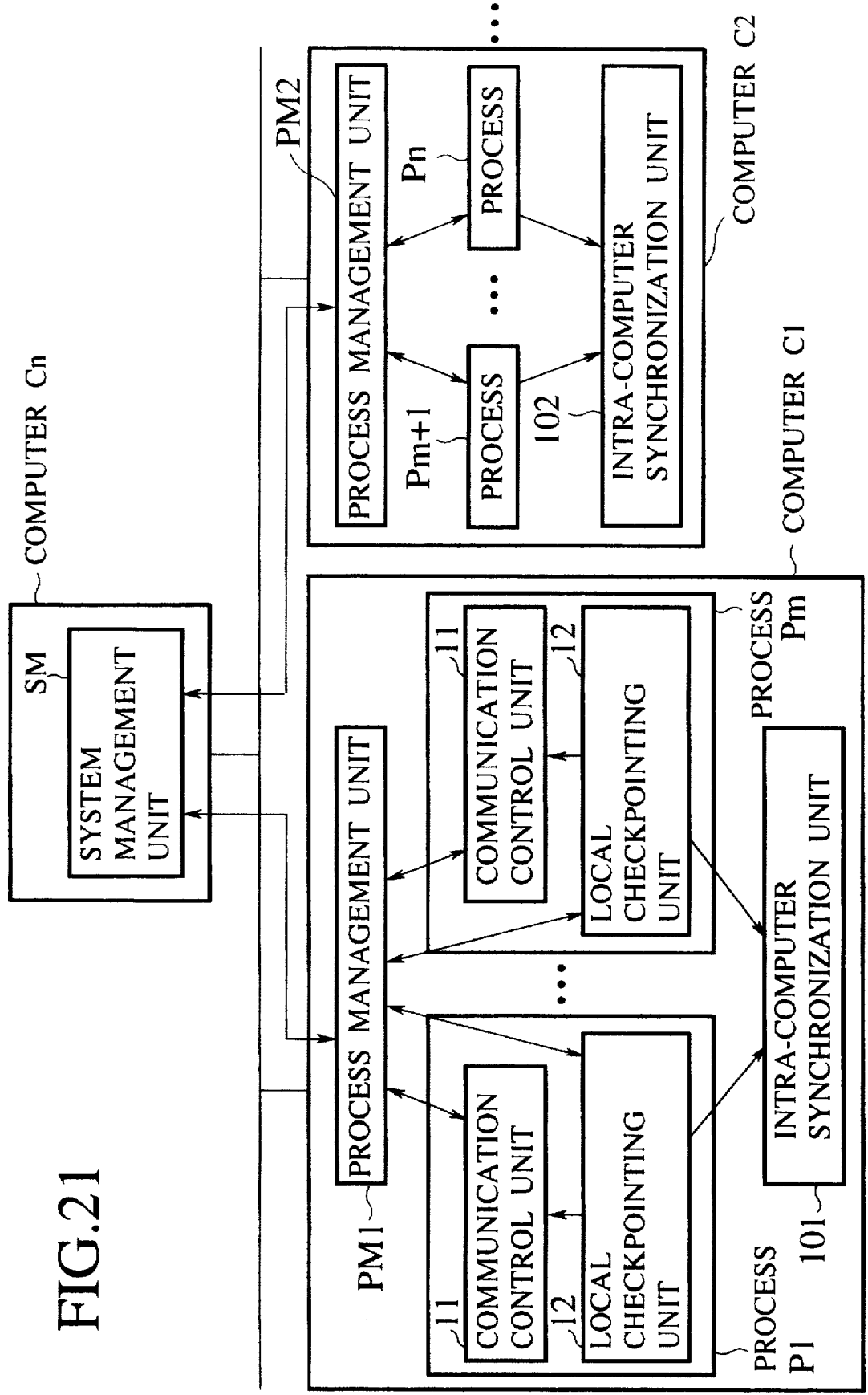
FIG. 21 is a block diagram showing a functional configuration of a distributed system to which the distributed checkpointing scheme of the fifth embodiment according to the present invention is applied.

FIG. 21 shows a functional configuration of a distributed system to which the distributed checkpointing scheme of this fifth embodiment is applied.

In the first to fourth embodiments described above, all the inter-process communications are stopped at the first phase, and the local checkpointing is carried out at the second phase. However, as far as the intra-computer IPC for the shared memory, etc. is concerned, it suffices to establish the synchronization within that computer.

For this reason, in this fifth embodiment, as shown in FIG. 21, each computer is provided with an intra-computer synchronization unit 101, 102, etc. for establishing the synchronization of the processes within the computer. Then, at the first phase, the inter-computer IPC is stopped, and at the second phase, the local checkpointing is carried out after the intra-computer synchronization unit is used to stop the intra-computer IPC first. By means of this, it is possible to further shorten the stopping time of the intra-computer IPC among the inter-process communications. The first phase of the fourth embodiment realizes the synchronization among the computers, and this fifth embodiment utilizes the fact that the intra-computer synchronization unit requires a shorter time compared with the synchronization among the computers.

Figure 22:
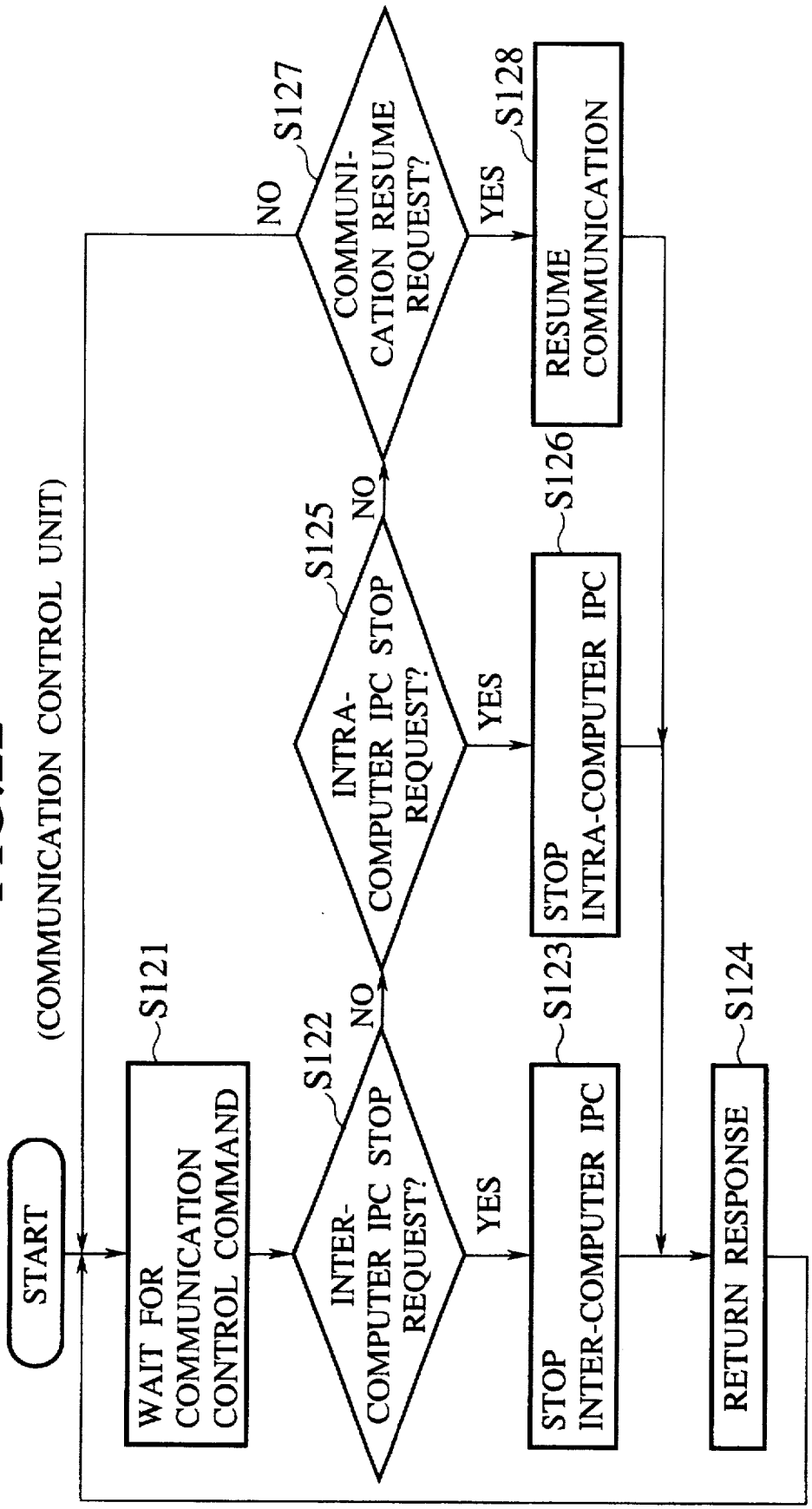
FIG. 22 is a flow chart of the operation by the communication control unit in the distributed system of FIG. 21.
Figure 23:
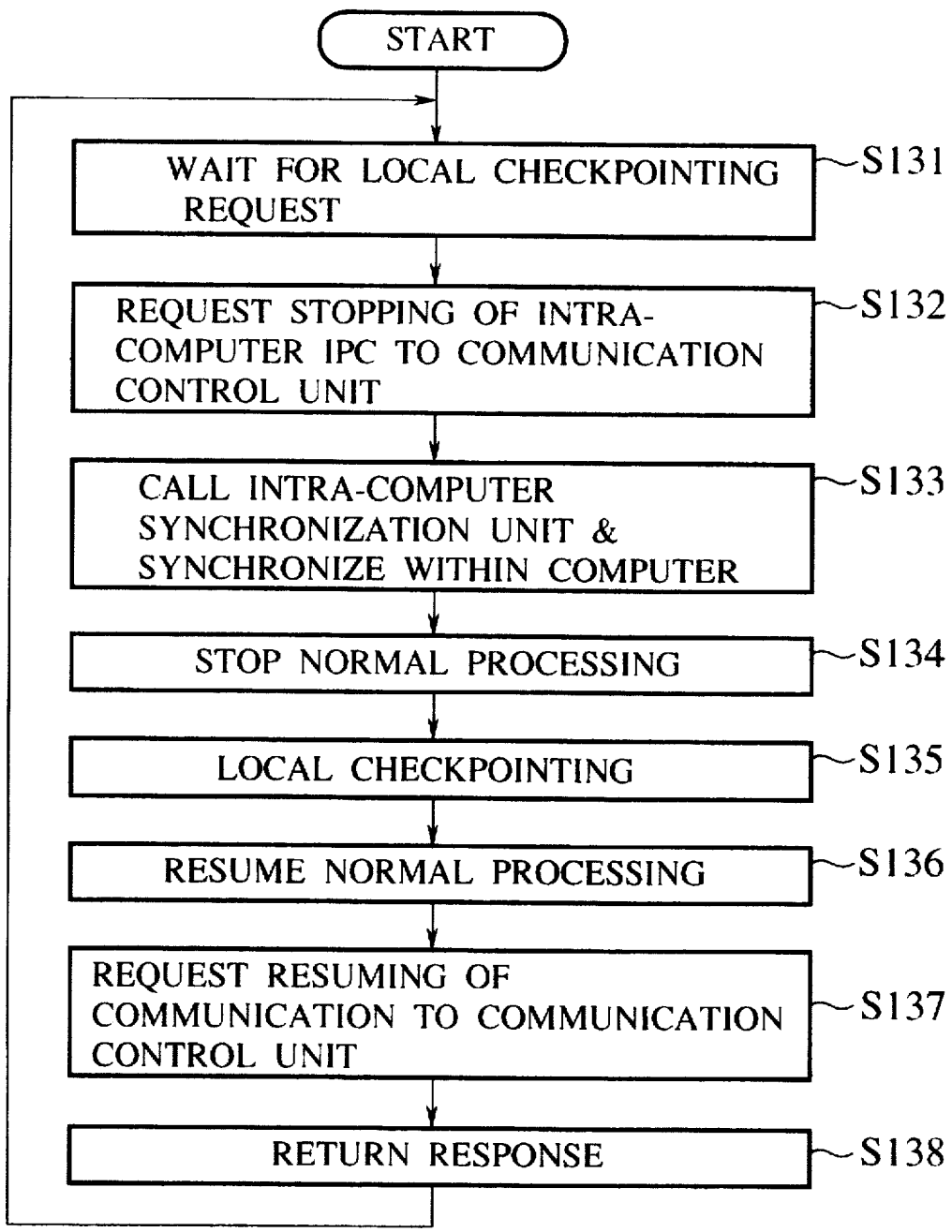
FIG. 23 is a flow chart of the operation for the local checkpointing unit in the distributed system of FIG. 21.
Figure 24:
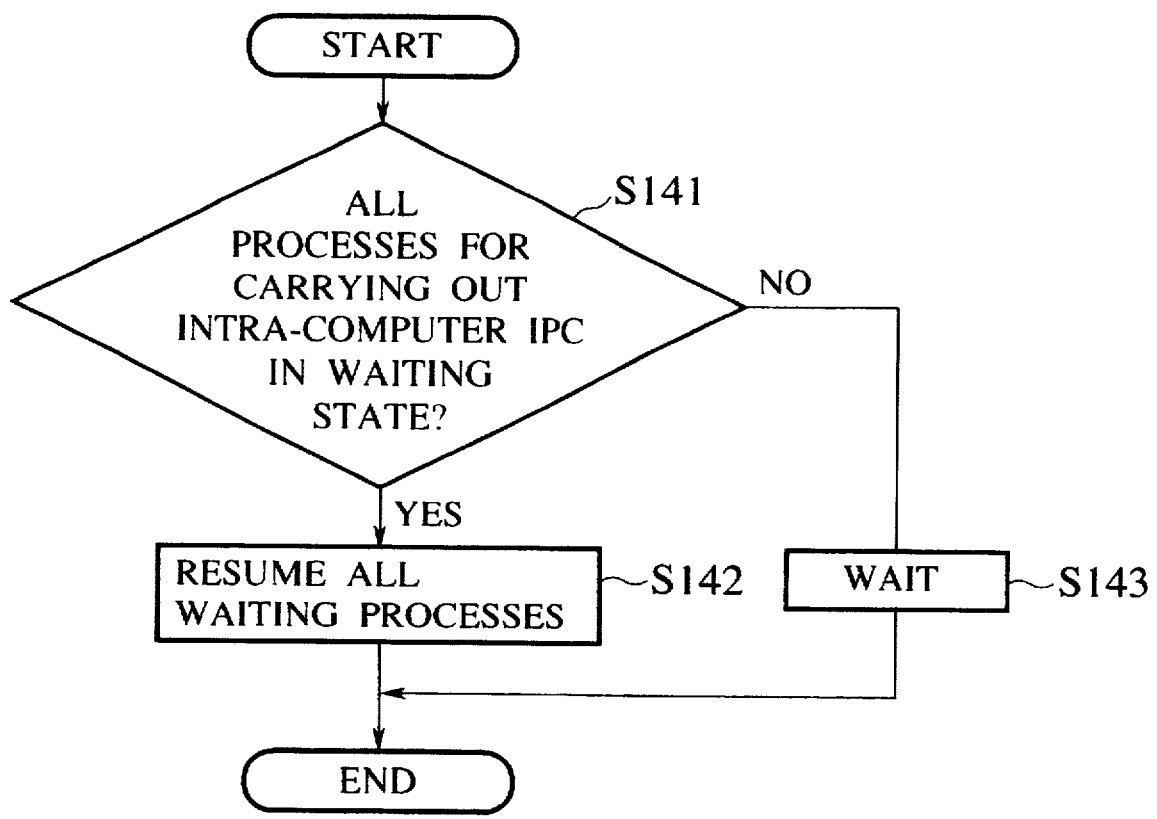
FIG. 24 is a flow chart of the operation for the intra-computer synchronization unit in the distributed system of FIG. 21.

Now, with references to the flow charts of FIG. 22, FIG. 23 and FIG. 24, a procedure for the distributed checkpointing in this fifth embodiment will be described. Here, FIG. 22 shows a flow chart of the operation by the communication control unit 11, FIG. 23 shows a flow chart of the operation by the local checkpointing unit 12, and FIG. 24 shows a flow chart of the operation by the intra-computer synchronization unit. Here, the system management unit SM and the process management units PM are substantially similar to those used in the fourth embodiment described above.

The communication control unit 11 is awaiting for the communication control command (step S121). When the inter-computer IPC stop request is received (step S122 YES), the inter-computer IPC is stopped (step S123). When the intra-computer IPC stop request is received (step S125 YES), the intra-computer IPC is stopped (step S126). When the communication resume request is received (step S127 YES), all the inter-process communications are resumed (step S128). When the processing in any of the steps S123, S126 and S128 is finished, a response to the request is returned (step S124).

The local checkpointing unit 12 is awaiting for the local checkpointing request (step S131). When the local checkpointing request is received, the local checkpointing unit 12 issues the intra-computer IPC stop request to the communication control unit 11 (step S132). Then, the intra-computer synchronization unit is called up and the synchronization within the computer is carried out (step S133). Then, the stopping of the normal processing (step S134), the local checkpointing (step S135), the resuming of the normal processing (step S136), and the communication resume request to the communication control unit 11 (step S137) are carried out as in the previous embodiments, and the response is returned to the process management unit (step S138).

Here, the processing of the local checkpointing unit 12 in this fifth embodiment presupposes that the process is operating under the multi-thread environment. Namely, the threads other than the thread which is carrying out the checkpointing are operating during the checkpointing, so that the intra-computer IPC stop processing is carried out. However, in a case where the process is operating as a single thread, the other processing in the process will not be carried out during the checkpointing, so that the stopping of the intra-computer IPC is unnecessary, and it suffices to simply establish the synchronization by the intra-computer synchronization unit.

In the intra-computer synchronization unit, whether all the processes for carrying out the intra-computer IPC are in a waiting state or not is checked (step S141), and if so, all the waiting processes are resumed (step S142), whereas otherwise the intra-computer synchronization unit is set in a waiting state (step S143).

Figure 25A:
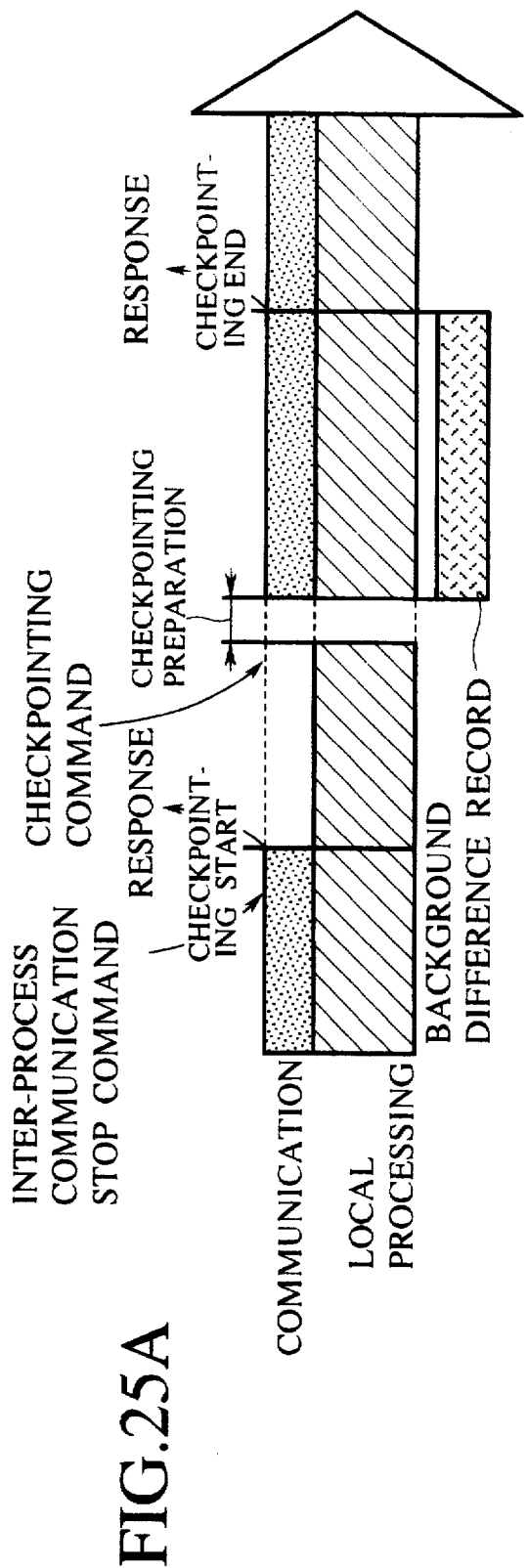
FIGS. 25A and 25B are timing charts for the checkpointing processing in a case of the first to fourth embodiments and a case of the fifth embodiment of the present invention, respectively.

To illustrate the effect of this fifth embodiment, FIG. 25A shows a case of the first to fourth embodiments described above, while FIG. 25B shows a case of this fifth embodiment. In this fifth embodiment, only the inter-computer IPC is stopped at the first phase, and the stopping of the intra-computer IPC and the local checkpointing are carried out at the second phase. In addition, in the local checkpointing processing, the storing of the dirty page is carried out in parallel to the normal processing similarly as in the second and third embodiments described above.

Figure 25B:
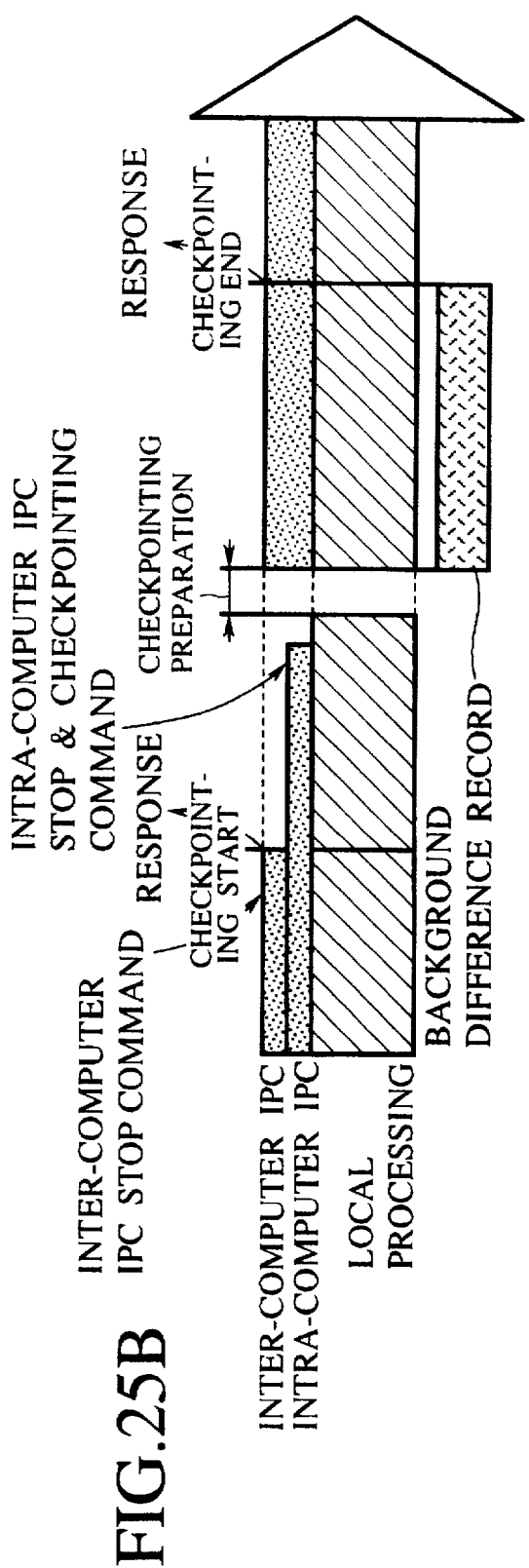

In contrast to a case of the first to fourth embodiments shown in FIG. 25A where all the inter-process communications are stopped at the first phase, it can be seen in FIG. 25B that the stopping time of the intra-computer IPC is further shortened in this fifth embodiment.

As described, according to the present invention, it is possible to realize the distributed checkpointing for a plurality of processes which carry out the inter-process communications by the message passing or the information exchange using shared memory or file sharing, while shortening a stopping time of the processes due to the distributed checkpointing.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for checkpointing for a plurality of processes operating under a distributed processing environment while carrying out inter-process communications, the method comprising the steps of:

stopping the inter-process communications of each process while continuing a normal processing of each process; and executing a checkpointing processing for each process, when the inter-process communications of all processes are stopped at the stopping step.

2. The method of claim 1, wherein the executing step also stops the normal processing of each process during the checkpointing processing.

3. The method of claim 2, further comprising the step of:

resuming the inter-process communications and the normal processing of each process when the checkpointing processing for each process is finished.

4. The method of claim 1, further comprising the step of recording dirty pages to which a writing is carried out by the normal processing of each process since a last checkpoint;

wherein the executing step executes the checkpointing processing for storing only the dirty pages recorded at the recording step into a checkpoint, in parallel to the normal processing.

5. The method of claim 4, further comprising the step of stopping the normal processing of each process when an access request to an unstored dirty page is issued by the normal processing of each process during the checkpointing processing for each process.

6. The method of claim 5, further comprising the step of resuming the normal processing for each process when the unstored dirty page is stored by the checkpointing processing.

7. The method of claim 4, wherein when an access request to an unstored dirty page is issued by the normal processing during the checkpointing processing, the checkpointing processing stores the unstored dirty page with priority over other dirty pages.

8. The method of claim 1, wherein the distributed processing system includes a checkpoint command process for controlling start and stopping of the checkpointing processing, the method further comprising the steps of:

sending an inter-process stop signal to said checkpoint command process from each of said plurality of processes upon stopping of the inter-process communications at said corresponding one of said plurality of processes, wherein the normal processing of said each of said plurality of processes is continued until an intra-process stop signal is received by said each of said plurality of processes; and sending, from said checkpoint command process to said each of said plurality of processes, said intra-process stop signal when said inter-process stop signal has been received from every one of said plurality of processes.

9. A method for checkpointing for a plurality of processes operating under a distributed processing environment while carrying out inter-process communications, the method comprising the steps of:
    commanding each process to stop the inter-process communications of each process while continuing a normal processing of each process; and
    commanding each process to execute a checkpointing processing for each process, when a stopping of the inter-process communications of all processes is confirmed.

10. A method for checkpointing for a plurality of processes operating under a distributed processing environment while carrying out inter-process communications, the method comprising the steps of:
    stopping at each process the inter-process communications of each process while continuing a normal processing of each process, upon receiving an inter-process communication stop command; and
    starting at each process an execution of a checkpointing processing for each process, upon receiving a checkpointing command.

11. A method for checkpointing for a plurality of processes on computers, the processes being operating under distributed processing environment while carrying out inter-process communications including inter-computer type inter-process communications to be carried out among the computers and intra-computer type inter-process communications to be carried out within one computer, the method comprising the steps of:
    stopping the inter-computer type inter-process communications of each process while continuing the intra-computer type inter-process communications and a normal processing of each process; and
    executing a checkpointing processing for each process while stopping the intra-computer type Inter-process communications of each process, when the inter-computer type inter-process communications of all processes are stopped at the stopping step.

12. The method of claim 11, wherein the executing step also stops the normal processing of each process during the checkpointing processing.

13. The method of claim 12, further comprising the step of:
    resuming the inter-process communications and the normal processing of each process when the checkpointing processing for each process is finished.

14. The method of claim 11, further comprising the step of recording dirty pages to which a writing is carried out by the normal processing of each process since a last checkpoint;
    wherein the executing step executes the checkpointing processing for storing only the dirty pages recorded at the recording step into a checkpoint, in parallel to the normal processing.

15. The method of claim 14, further comprising the step of stopping the normal processing of each process when an access request to an unstored dirty page is issued by the normal processing of each process during the checkpointing processing for each process.

16. The method of claim 15, further comprising the step of resuming the normal processing for each process when the unstored dirty page is stored by the checkpointing processing.

17. The method of claim 14, wherein when an access request to an unstored dirty page is issued by the normal processing during the checkpointing processing, the checkpointing processing stores the unstored dirty page with priority over other dirty pages.

18. A method for checkpointing for a plurality of processes on computers, the processes being operating under a distributed processing environment while carrying out inter-process communications including inter-computer type inter-process communications to be carried out among the computers and intra-computer type inter-process communications to be carried out within one computer, the method comprising the steps of:
    commanding each process to stop the inter-computer type inter-process communications of each process while continuing the intra-computer type inter-process communications and a normal processing of each process; and
    commanding each process to execute a checkpointing processing for each process while stopping the intra-computer type inter-process communications of each process, when a stopping of the inter-computer type inter-process communications of all processes is confirmed.

19. A method for checkpointing for a plurality of processes on computers, the processes being operating under a distributed processing environment while carrying out inter-process communications including inter-computer type inter-process communications to be carried out among the computers and intra-computer type inter-process communications to be carried out within one computer, the method comprising the steps of:
    stopping at each process the inter-computer type inter-process communications of each process while continuing the intra-computer type inter-process communications and a normal processing of each process, upon receiving an inter-computer type inter-process communication stop command; and
    starting at each process an execution of a checkpointing processing for each process while stopping the intra-computer type inter-process communications of each process, upon receiving a checkpointing command.

20. A computer system, comprising:
    a plurality of process means operating under a distributed processing environment while carrying out inter-process communications; and
    checkpointing command means for issuing an inter-process communication stop command commanding a stopping of the inter-process communications of each process means, and issuing a checkpointing command commanding an execution of a checkpointing processing for each process means when responses to the inter-process communication stop commands from all process means are received;
    wherein each process means stops the inter-process communications of each process means while continuing a normal processing of each process means upon receiving the inter-process communication stop command and returns a response to the inter-process communication stop command when the inter-process communications of each process means are stopped, and starts an execution of the checkpointing processing for each process means upon receiving the checkpointing command.

21. The computer system of claim 20, further comprising:
    process management means, provided on each computer constituting the computer system, for managing the process means provided on each computer; and wherein the checkpointing command means is provided on one computer constituting the computer system, and issues the inter-process communication stop command and the checkpointing command for each process means through the process management means which manages each process means.

22. A computer system, comprising:

a plurality of process means provided on computers, the process means being operating under a distributed processing environment while carrying out inter-process communications including inter-computer type inter-process communications to be carried out among the computers and intra-computer type inter-process communications to be carried out within one computer; and checkpointing command means for issuing an inter-computer type inter-process communication stop command commanding a stopping of the inter-computer type inter-process communications of each process means, and issuing a checkpointing command commanding an execution of a checkpointing processing for each process means and a stopping of the intra-computer type inter-process communications of each process means when responses to the inter-computer type inter-process communication stop commands from all process means are received;

wherein each process means stops the inter-computer type inter-process communications of each process means while continuing the intra-computer type inter-process communications and a normal processing of each process means upon receiving the inter-computer type inter-process communication stop command and returns a response to the inter-computer type inter-process communication stop command when the inter-computer type inter-process communications of each process means are stopped, and starts an execution of the checkpointing processing for each process means while stopping the intra-computer type inter-process communications of each process means upon receiving the checkpointing command.

* * * * *